United States Patent [19]
Nozawa

[11] Patent Number: 5,483,380
[45] Date of Patent: Jan. 9, 1996

[54] COMPACT ZOOM LENS SYSTEM HAVING HIGH ZOOM RATIO AND WIDE VIEW ANGLE

[75] Inventor: Toshihide Nozawa, Tokyo, Japan

[73] Assignee: Olympus Optical Co., Ltd., Tokyo, Japan

[21] Appl. No.: 141,025

[22] Filed: Oct. 25, 1993

[30] Foreign Application Priority Data

| Oct. 26, 1992 | [JP] | Japan | 4-287692 |
| Apr. 7, 1993 | [JP] | Japan | 5-080536 |
| May 19, 1993 | [JP] | Japan | 5-116793 |

[51] Int. Cl.⁶ ........................... G02B 15/14
[52] U.S. Cl. ........................... 359/686; 359/684
[58] Field of Search ........................... 359/686, 683, 359/684

[56] References Cited

U.S. PATENT DOCUMENTS

| 4,682,860 | 7/1987 | Tanaka et al. | 359/692 |
| 4,720,179 | 1/1988 | Ito | 359/692 |
| 4,756,609 | 7/1988 | Estelle | 359/686 |
| 4,787,718 | 11/1988 | Cho | 359/686 |
| 4,838,669 | 6/1989 | Ogata et al. | 359/692 |
| 4,984,877 | 1/1991 | Ito | 359/692 |
| 5,111,338 | 5/1992 | Nakayama | 359/686 |
| 5,126,884 | 6/1992 | Sato | 359/692 |
| 5,144,489 | 9/1992 | Shibayama | 359/692 |
| 5,162,947 | 11/1992 | Ito | 359/692 |
| 5,164,859 | 11/1992 | Ito | 359/692 |
| 5,270,865 | 12/1993 | Kikuchi et al. | 359/686 |

FOREIGN PATENT DOCUMENTS

| 1307715 | 12/1989 | Japan. |
| 237317 | 2/1990 | Japan. |
| 2135312 | 5/1990 | Japan. |
| 2201409 | 8/1990 | Japan. |
| 2284109 | 11/1990 | Japan. |

*Primary Examiner*—Scott J. Sugarman
*Attorney, Agent, or Firm*—Cushman, Darby & Cushman

[57] ABSTRACT

A compact zoom lens system suitable for use with a compact camera or the like, which has a view angle of 70° or more at the wide end and a zoom ratio of 2.5 or higher and in which various aberrations, particularly field curvature, distortion, axial and lateral chromatic aberrations, are effectively corrected over the entire zoom range, from the wide end to the tele end. The zoom lens system comprises, in order from the object side, a negative 1-st lens unit (G1), a positive 2-nd lens unit (G2), a positive 3-rd lens unit (G3), and a negative 4-th lens unit (G4). During zooming from the wide end to the tele end, the 1-st and 3-rd lens units (G1) and (G3) move together as one unit toward the object side, while the 4-th lens unit moves toward the object side so that the spacing between the same and the 3-rd lens unit (G3) monotonously decreases. Meantime, the 2-nd lens unit (G2) moves so that, during its movement from the wide end to the middle focal length position, it approaches the 1-st lens unit (G1), whereas, during its movement from the middle focal length position to the tele end, the 2-nd lens unit (G2) approaches the 3-rd lens unit (G3).

22 Claims, 13 Drawing Sheets

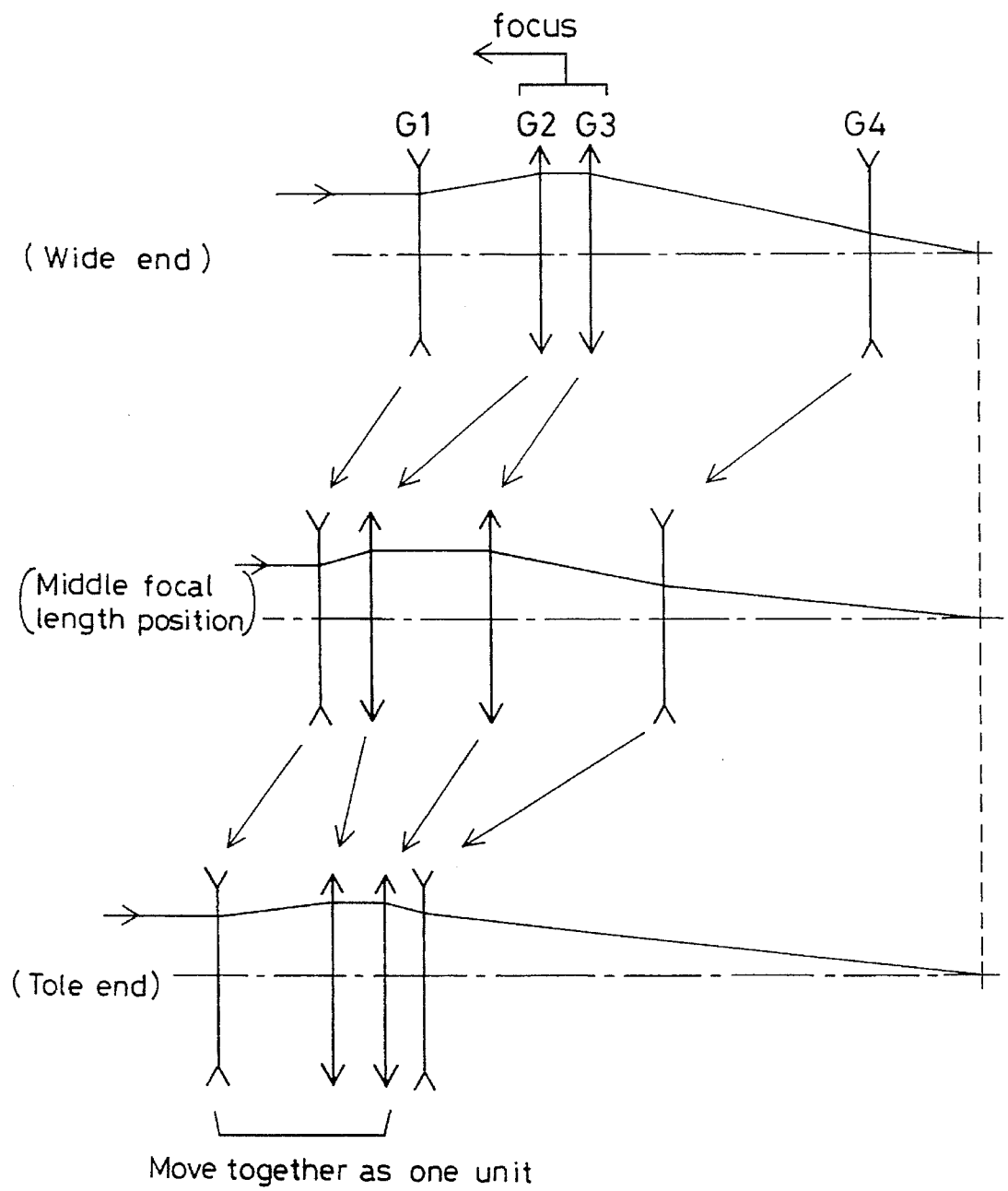

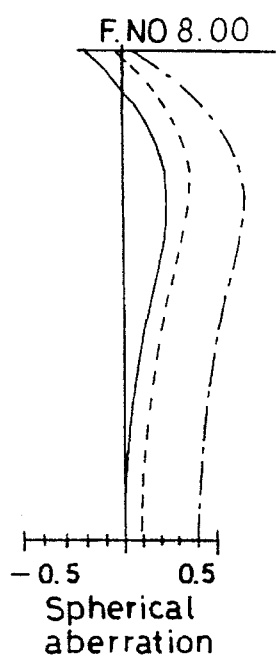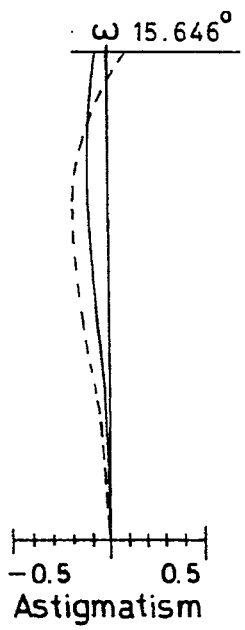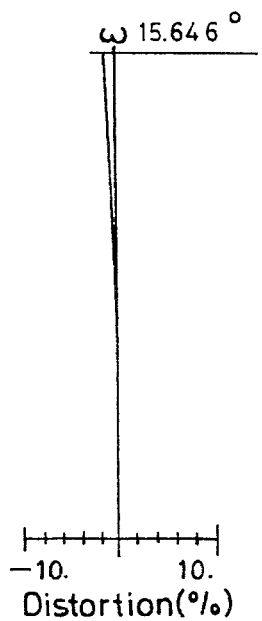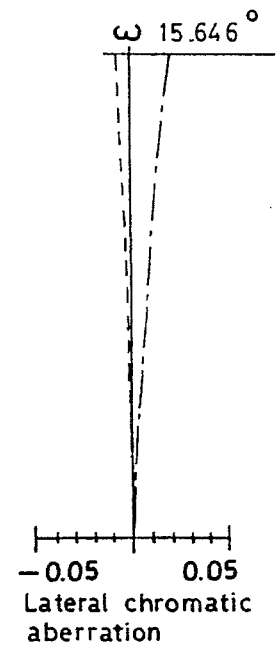

F. NO 8.00
−0.5　0.5
Spherical aberration

ω 14.811°
−0.5　0.5
Astigmatism

ω 14.811°
−10.　10.
Distortion(%)

ω 14.811°
−0.05　0.05
Lateral chromatic aberration

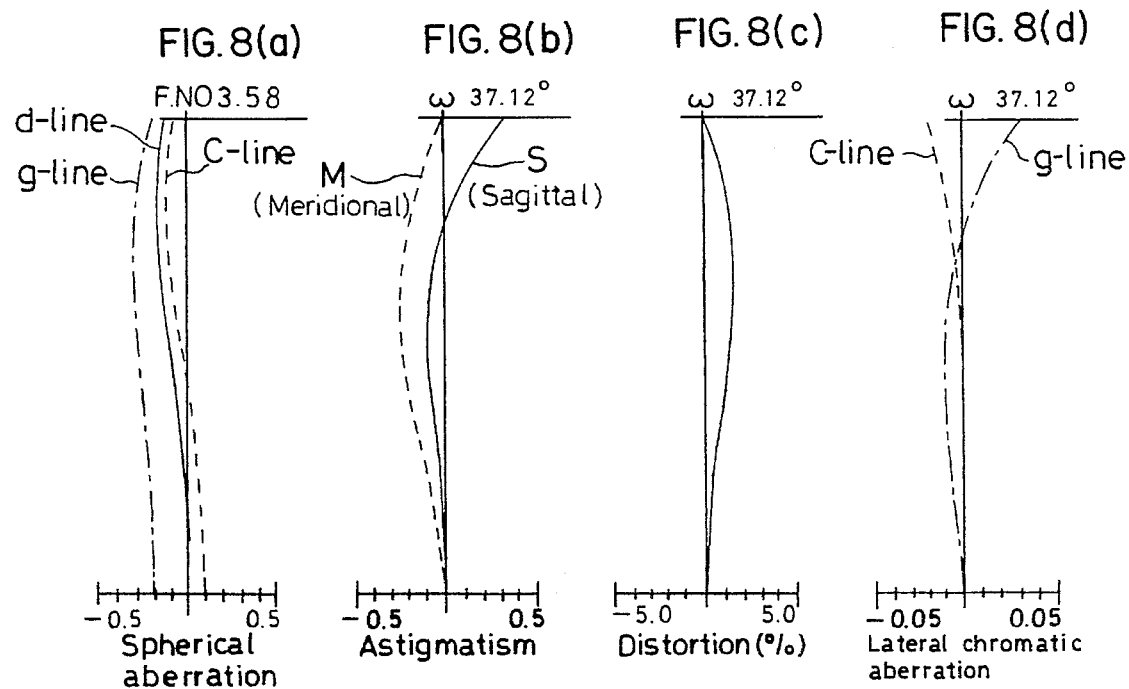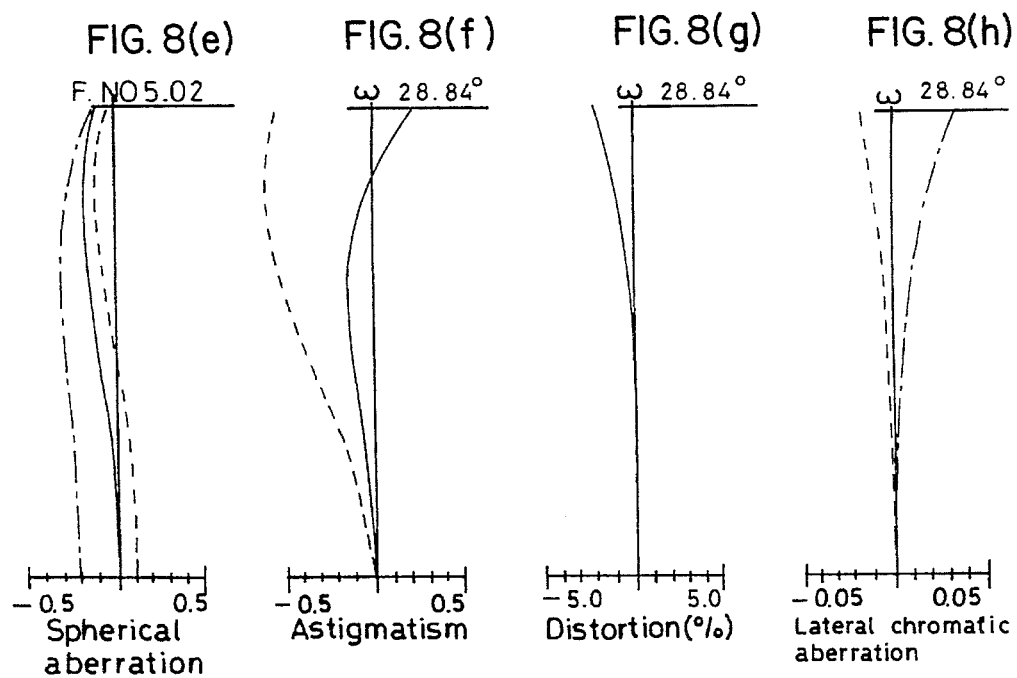

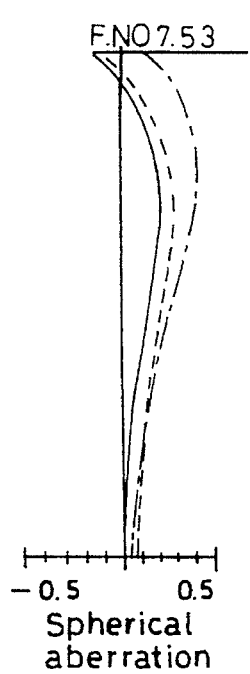 FIG. 8(i) Spherical aberration F.NO 7.53
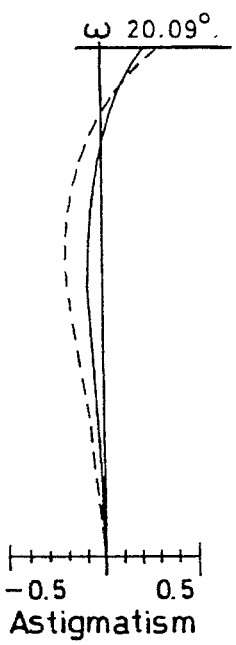 FIG. 8(j) Astigmatism ω 20.09°
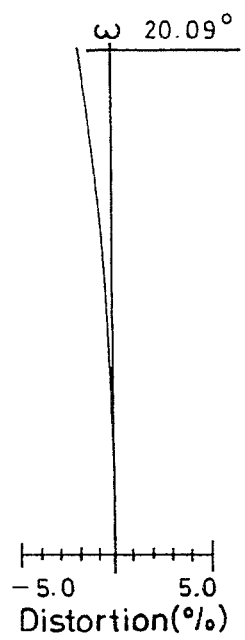 FIG. 8(k) Distortion(%) ω 20.09°
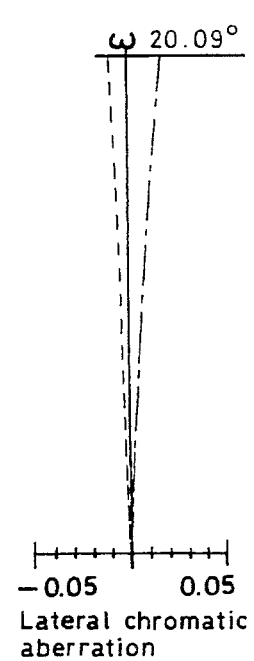 FIG. 8(l) Lateral chromatic aberration ω 20.09°

Spherical aberration

Astigmatism

Distortion (%)

Lateral chromatic aberration

Spherical aberration

Astigmatism

Distortion (%)

Lateral chromatic aberration

Spherical aberration

Astigmatism

Distortion(%)

Lateral chromatic aberration

COMPACT ZOOM LENS SYSTEM HAVING HIGH ZOOM RATIO AND WIDE VIEW ANGLE

BACKGROUND OF THE INVENTION

The present invention relates to a compact zoom lens system having a high zoom ratio and a wide view angle. More particularly, the present invention relates to a wide-angle zoom lens system which is mainly used with a compact camera or the like having a relatively short back focus and which has a view angle of 70° or more at the wide end and a zoom ratio of 2.5 or higher.

There have heretofore been proposed a large number of zoom lens systems for compact cameras of a two-unit type in which a positive lens unit and a negative lens unit are disposed in order from the object side, as disclosed in Japanese Patent Application Laid-Open (KOKAI) Nos. 56-128911, 62-264019, 63-266413, and so forth. However, in most of these zoom lens systems, the view angle at the wide end is about 60° at most.

To meet the demand for compact cameras having a wider view angle, some zoom lens systems for compact cameras which are of the two-unit type and which provide a view angle of 70° or more at the wide end have recently been proposed. For example, see Japanese Patent Application Laid-Open (KOKAI) Nos. 02-284109, 03-200913, and 04-22911.

However, none of these known zoom lens systems are satisfactory in terms of performance. That is, the conventional zoom lens systems suffer from some problems.

For example, the curvature of field largely bends toward the positive side at the wide end, and a large distortion toward the positive side also occurs at the wide end. In addition, there are large fluctuations in the axial and lateral chromatic aberrations due to zooming.

As zoom lens systems having a view angle of 70° or more at the wide end and a zoom ratio of 2.5 or more, there is known a three-unit type zoom lens system having, in order from the object side, a negative lens unit, a positive lens unit, and a negative lens unit, as disclosed in Japanese Patent Application Laid-Open (KOKAI) Nos. 02-37317 and 02-201409, and another three-unit type zoom lens system having, in order from the object side, a positive lens unit, a positive lens unit, and a negative lens unit, as disclosed in Japanese Patent Application Laid-Open (KOKAI) No. 02-135312.

These three-unit type zoom lens systems, however, have the problem that since the overall length is long and the outer diameter of the first lens unit is also large, the overall size of the camera is correspondingly large. Particularly, at the wide end, the visual field of the viewfinder is vignetted by the lens frame because of the long overall length of the lens system.

If it is intended to improve a two-unit type zoom lens system having a positive lens unit and a negative lens unit so that the zoom ratio is raised to 2 or more and the overall length is minimized, the curvature of field bows toward the negative side at the middle focal length position, and it bows toward the positive side at the tele end.

To solve this problem, Japanese Patent Application Laid-Open (KOKAI) Nos. 02-34812 and 01-307715 divide the 1-st lens unit into a positive or negative lens unit and a positive lens unit and employ a device for non-linearly varying the spacing between these two lens units.

In these known zoom lens systems, however, the view angle at the wide end is about 60°, and the zoom ratio is about 2.3.

Japanese Patent Application Laid-Open (KOKAI) No. 64-88512 discloses a zoom lens system capable of attaining a zoom ratio of 2.5 or higher with a lens arrangement having four lens units, that is, a negative lens unit, a positive lens unit, a positive lens unit, and a negative lens unit, in the same way as in the case of the present invention, described later. In this zoom lens system, however, the view angle at the wide end is about 62°, and since each lens unit moves individually, a large number of cams are needed for zooming, which is unfavorable from the viewpoint of designing a lens frame for the zoom lens system.

Japanese Patent Application Laid-Open (KOKAI) No. 62-235916 also discloses a zoom lens system having four lens units, i.e., a negative lens unit, a positive lens unit, a positive lens unit, and a negative lens unit, in which the first and third lens units are adapted to move together as one unit in the same way as in the present invention. In the zoom lens system of this publication, however, the second lens unit is adapted to move for the purpose of correcting lateral chromatic aberration and hence monotonously moves toward the first lens unit. Thus, the second lens unit does not contribute to the correction of the bowing of the field curvature at the middle focal length position, which is a problem arising when the zoom ratio is raised, as described above. Therefore, the zoom ratio is only about 2, and the view angle at the wide end is only about 62°.

As has been described above, to meet the demand for compact cameras having a wider view angle and a higher zoom ratio, the view angle at the wide end has been widened to 70° or more and the zoom ratio has also been raised to 2 or more in recent years. If it is intended to widen the view angle at the wide end by using a conventional two-unit type zoom lens system having a positive lens unit and a negative lens unit, the curvature of field largely bends toward the positive side at the wide end, and a large distortion toward the positive side also occurs at the wide end. If it is intended to further raise the zoom ratio, the curvature of field bows toward the negative side at the middle focal length position, and it bows toward the positive side at the tele end. In addition, there are large fluctuations in the axial and lateral chromatic aberrations due to zooming.

SUMMARY OF THE INVENTION

In view of the above-described circumstances, it is an object of the present invention to provide a compact zoom lens system suitable for use with a compact camera or the like, which has a view angle of 70° or more at the wide end and a zoom ratio of 2.5 or higher and in which various aberrations, particularly field curvature, distortion, axial and lateral chromatic aberrations, are effectively corrected over the entire zoom range, from the wide end to the tele end.

It is another object of the present invention to provide a focusing method whereby the image surface sensitivity of a focusing lens unit in the above-described compact, high-zoom ratio and wide-angle zoom lens system can be adjusted to a level at which it can be mechanically controlled even at the tele end.

To attain the above-described objects, the present invention provides a compact zoom lens system having a high zoom ratio and a wide view angle, comprising, in order from the object side, a 1-st lens unit having a negative refractive power, a 2-nd lens unit having a positive refractive power, which is disposed to face the 1-st lens unit across an air spacing, a 3-rd lens unit having a positive refractive power, which is disposed to face the 2-nd lens unit across an air spacing, and a 4-th lens unit having a negative refractive power, which is disposed to face the 3-rd lens unit across an air spacing, wherein, during zooming from the wide end to the tele end, the 1-st and 3-rd lens units move together as one unit toward the object side, while the 2-nd lens unit moves so that, during its movement from the wide end to the middle focal length position, the spacing between the 1-st and 2-nd lens units decreases, whereas, during its movement from the middle focal length position to the tele end, the spacing between the 2-nd and 3-rd lens units decreases, and the 4-th lens unit moves so that the spacing between the same and the 3-rd lens unit decreases.

In addition, the present invention provides a compact zoom lens system having a high zoom ratio and a wide view angle, comprising, in order from the object side, a 1-st lens unit having a negative refractive power, a 2-nd lens unit having a positive refractive power, which is disposed to face the 1-st lens unit across an air spacing, a 3-rd lens unit having a positive refractive power, which is disposed to face the 2-nd lens unit across an air spacing, an aperture stop, and a 4-th lens unit having a negative refractive power, which is disposed to face the 3-rd lens unit across an air spacing and the aperture stop, wherein, during zooming from the wide end to the tele end, the 1-st and 3-rd lens units move together as one unit toward the object side, while the aperture stop moves together with the 3-rd lens unit, and the 4-th lens unit moves so that the spacing between the same and the 3-rd lens unit decreases.

In addition, the present invention provides a compact zoom lens system having a high zoom ratio and a wide view angle, comprising, in order from the object side, a 1-st lens unit having a negative refractive power, a 2-nd lens unit having a positive refractive power, which is disposed to face the 1-st lens unit across an air spacing, a 3-rd lens unit having a positive refractive power, which is disposed to face the 2-nd lens unit across an air spacing, and a 4-th lens unit having a negative refractive power, which is disposed to face the 3-rd lens unit across an air spacing, wherein, during zooming from the wide end to the tele end, the 1-st and 3-rd lens units move together as one unit toward the object side, while the 2-nd lens unit moves so that, during its movement from the wide end to the middle focal length position, the spacing between the 1-st and 2-nd lens units decreases, whereas, during its movement from the middle focal length position to the tele end, the spacing between the 2-nd and 3-rd lens units decreases, and the 4-th lens unit moves so that the spacing between the same and the 3-rd lens unit decreases, and wherein focusing from the infinite object point to the closest focusing distance is effected by moving the 2-nd and 3-rd lens units together as one unit toward the object side.

In addition, the present invention provides a compact zoom lens system having a high zoom ratio and a wide view angle, comprising, in order from the object side, a 1-st lens unit having a negative refractive power, a 2-nd lens unit having a positive refractive power, which is disposed to face the 1-st lens unit across an air spacing, a 3-rd lens unit having a positive refractive power, which is disposed to face the 2-nd lens unit across an air spacing, an aperture stop, and a 4-th lens unit having a negative refractive power, which is disposed to face the 3-rd lens unit across an air spacing and the aperture stop, wherein, during zooming from the wide end to the tele end, the 1-st and 3-rd lens units move together as one unit toward the object side, while the aperture stop moves together with the 3-rd lens unit, and the 4-th lens unit moves so that the spacing between the same and the 3-rd lens unit decreases, and wherein focusing from the infinite object point to the closest focusing distance is effected by moving the 2-nd and 3-rd lens units together as one unit toward the object side.

The reason for adopting the above-described arrangements and the functions thereof will be explained below.

FIG. 1 shows schematically an optical arrangement of a zoom lens system according to the present invention. As illustrated in FIG. 1, the zoom lens system of the present invention comprises, in order from the object side, a negative 1-st lens unit G1, a positive 2-nd lens unit G2, a positive 3-rd lens unit G3, and a negative 4-th lens unit G4. During zooming from the wide end to the tele end, the 1-st and 3-rd lens units G1 and G3 move together as one unit toward the object side, while the 4-th lens unit moves toward the object side so that the spacing between the same and the 3-rd lens unit G3 monotonously decreases. Meantime, the 2-nd lens unit G2 moves so that, during its movement from the wide end to the middle focal length position, it approaches the 1-st lens unit G1, whereas, during its movement from the middle focal length position to the tele end, the 2-nd lens unit G2 approaches the 3-rd lens unit G3.

The zooming action from the wide end to the tele end is mainly effected by the movement of the 4-th lens unit G4.

The movement of the 2-nd lens unit G2 corrects the bowing of the curvature of field at the middle focal length position. As has been described above, the conventional zoom lens system having two, positive and negative, lens units suffers from the problem that the field curvature bows toward the negative side at the middle focal length position. In the zoom lens system of the present invention, the 2-nd lens unit G2 is moved so as to be closest to the 1-st lens unit G1 at the middle focal length position, thereby increasing a positive field curvature occurring in the 2-nd lens unit G2 to correct the field curvature at the middle focal length position. Thus, it becomes possible to achieve a higher zoom ratio.

Further, the provision of the negative 1-st lens unit G1 makes it possible to correct the bend of field curvature and the distortion, which are problems arising when the view angle at the wide end is widened. Thus, it becomes possible to enlarge the view angle at the wide end.

Since the 1-st lens unit G1 moves together with the 3-rd lens unit G3 as one unit, three cams suffice for zooming. Accordingly, it is possible to use a lens frame designed for a three-unit type zoom lens system although the zoom lens system of the present invention is of the four-unit type.

Furthermore, it is preferable, with a view to attaining a reduction in the overall size of the lens system, to satisfy the following conditions:

$$1.2 < |f_1|/F_W < 1.6 \quad (1)$$

$$0.5 < |f_4|/F_W < 1.0 \quad (2)$$

$$0.4 < f_3/f_2 < 0.7 \quad (3)$$

where $F_W$ is the focal length of the entire system at the wide end; $f_1$ is the focal length of the 1-st lens unit G1; $f_2$ is the focal length of the 2-nd lens unit G2; $f_3$ is the focal length of the 3-rd lens unit G3; and $f_4$ is the focal length of the 4-th lens unit G4.

The condition (1) relates to the focal length of the 1-st lens unit G1 and must be satisfied in order to set the overall length and the back focus with good balance and to correct aberrations such as field curvature and distortion with good balance. If the upper limit of the condition (1) is exceeded, the power of the 1-st lens unit G1 becomes weak. Accordingly, it is impossible to lengthen the back focus, and the outer diameter of the 4-th lens unit G4 increases. In addition, it is likely that an image of dust attached to the final lens surface will be taken and formed on the film. Moreover, it becomes difficult to correct astigmatism and distortion caused in the 4-th lens unit G4. If the lower limit of the condition (1) is not reached, the overall length of the lens system lengthens, and the astigmatism and distortion caused in the 1-st lens unit G1 unfavorably increase, resulting in overcorrection.

The condition (2) relates to the focal length of the 4-th lens unit G4. If the focal length of the 4-th lens unit G4 exceeds the upper limit of the condition (2), the amount of movement of the 4-th lens unit G4 for zooming increases. Accordingly, it becomes difficult to design a cam for zooming, and the overall length of the lens system at the tele end unfavorably increases. If the focal length of the 4-th lens unit G4 is shorter than the lower limit of the condition (2), it becomes difficult to correct off-axis aberrations, i.e., astigmatism and distortion, caused in the 4-th lens unit G4.

The condition (3) must be satisfied in order to optimally correct the field curvature caused by the movement of the 2-nd lens unit G2. If the upper limit of the condition (3) is exceeded, the power of the 2-nd lens unit G2 becomes excessively strong relative to the power of the 3-rd lens unit G3, resulting in an increase in the variation of the spherical aberration caused by the movement of the 2-nd lens unit G2. If the lower limit of the condition (3) is not reached, the variation of the field curvature caused by the movement of the 2-nd lens unit G2 becomes small, and hence the amount of movement of the 2-nd lens unit G2 increases, resulting in an increase in the overall length of the lens system because of the necessity to ensure the space for the movement.

It is preferable, with a view to minimizing fluctuations of axial and lateral chromatic aberrations due to zooming, to compose the 3-rd lens unit G3 of at least one double-convex lens and at least one negative meniscus lens and also compose the 4-th lens unit G4 of at least one positive meniscus lens and at least one negative meniscus lens and to satisfy the following conditions:

$$15 < v_{d(3P)} - v_{d(3N)} < 22 \qquad (4)$$

$$7 < v_{d(4N)} - v_{d(4P)} < 14 \qquad (5)$$

where $v_{d(3N)}$ is the average Abbe number of the negative lens in the 3-rd lens unit G3; $v_{d(3P)}$ is the average Abbe number of the positive lens in the 3-rd lens unit G3; $v_{d(4N)}$ is the average Abbe number of the negative lens in the 4-th lens unit G4; and $v_{d(4P)}$ is the average Abbe number of the positive lens in the 4-th lens unit G4.

The condition (4) relates mainly to the correction of axial chromatic aberration. If the upper limit of the condition (4) is exceeded, the axial chromatic aberration is over-corrected. Therefore, the axial chromatic aberration is aggravated particularly at the telephoto side. If the lower limit of the condition (4) is not reached, the axial chromatic aberration is under-corrected. Therefore, the axial chromatic aberration is aggravated particularly at the wide-angle side.

To correct the axial and lateral chromatic aberrations with good balance, it is preferable to satisfy the condition (5). If the upper limit of the condition (5) is exceeded, the fluctuation of the lateral chromatic aberration due to zooming increases, although the fluctuation of the axial chromatic aberration can be reduced. If the lower limit of the condition (5) is not reached, the fluctuation of the axial chromatic aberration increases, although the fluctuation of the lateral chromatic aberration can be reduced.

Further, it is possible to correct aberrations even more effectively by arranging the lens system such that the 1-st lens unit G1 includes at least one negative lens and the 2-nd lens unit G2 includes at least one negative meniscus lens and that the following conditions are satisfied:

$$0.3 < |(r_1 + r_2)/(r_1 - r_2)| < 1.0 \qquad (6)$$

$$1.4 < |(r_5 + r_6)/(r_5 - r_6)| < 2.2 \qquad (7)$$

where $r_1$ and $r_2$ are the respective curvature radii of the object- and image-side surfaces of the negative lens in the 1-st lens unit G1, and $r_5$ and $r_6$ are the respective curvature radii of the object- and image-side surfaces of the negative meniscus lens in the 2-nd lens unit G2.

If the relationship between the curvature radii is outside the condition (6), it becomes impossible to correct the astigmatism and distortion caused in the 3-rd and 4-th lens units G3 and G4 with good balance maintained between these aberrations and those caused in the 1-st lens unit G1. If the relationship between the curvature radii is outside the condition (7), it becomes impossible to correct the astigmatism and distortion caused in the 2-nd lens unit G2.

If the 3-rd lens unit G3 is formed by using a cemented lens including a double-convex, positive lens and a negative meniscus lens and the following condition is satisfied, a higher-order spherical aberration can be caused at the cemented surface of the 3-rd lens unit G3, so that the spherical aberration can be effectively corrected:

$$n_{d(3N)} - n_{d(3P)} > 0.24 \qquad (8)$$

where $n_{d(3N)}$ is the refractive index of the negative meniscus lens in the 3-rd lens unit G3, and $n_{d(3P)}$ is the refractive index of the double-convex, positive lens in the 3-rd lens unit G3.

If an aspherical surface is employed in either the 2-nd lens unit G2 or the 3-rd lens unit G3, the spherical aberration can be readily corrected. It is preferable for the aspherical surface employed to have such a configuration that the negative power becomes stronger as the distance from the optical axis increases toward the periphery.

Next, a focusing method effective for a compact zoom lens system as described above will be discussed. A large number of two-unit type zoom lens systems having a positive lens unit and a negative lens unit in order from the object side have heretofore been used as zoom lens systems for use with compact cameras having a relatively short back focus (for example, see Japanese Patent Application Laid-Open (KOKAI) Nos. 56-128911, 62-264019 and 63-266413). In such conventional zoom lens systems, focusing from the infinite object point to the closest focusing distance has generally been effected by moving the front, positive lens unit.

FIG. 5 shows a paraxial optical arrangement to explain the conventional focusing method for a conventional two-unit type zoom lens system having a positive front lens unit $G_F$ and a negative rear lens unit $G_R$. If the front lens unit $G_F$ is used as a focusing lens as in the arrangement shown in the figure, the amount of variation of the image surface position with respect to the stopping accuracy of the focusing lens unit, that is, the image surface sensitivity $\epsilon_F$ of the focusing lens unit, is the square of the lateral magnification $\beta_R$ of the rear lens unit $G_R$:

$$\epsilon_F = \beta_R^2 \qquad ①$$

In this case, the object point is considered to be at infinity.

The lateral magnification of the rear lens unit at the tele end increases as the zoom ratio of the zoom lens system becomes higher. Accordingly, the image surface sensitivity of the focusing lens unit at the tele end also increases. Hence, it is necessary to raise the stopping accuracy of the focusing lens unit in conformity to the achievement of a higher zoom ratio, and it becomes difficult to mechanically control the movement of the focusing lens unit.

Therefore, let us consider a focusing method whereby the image surface sensitivity of the focusing lens unit in a compact zoom lens system as shown in FIG. 1 can be adjusted to a level at which it can be mechanically controlled even at the tele end. In the paraxial optical arrangement of the zoom lens system according to the present invention shown in FIG. 1, the 2-nd and 3-rd lens units G2 and G3 constitute in combination a focusing lens unit.

Assuming that the lateral magnification for the infinite object point of the composite system, which is composed of the 2-nd and 3-rd lens units G2 and G3, is $\beta_{23}$ and the lateral magnification for the infinite object point of the 4-th lens unit G4 is $\beta_4$, the image surface sensitivity $\epsilon_{23}$ for the infinite object point of the composite system, which is composed of the 2-nd and 3-rd lens units G2 and G3 as a focusing lens unit, is given by $$\epsilon_{23} = \beta_4^2 - (\beta_{23}\beta_4)^2 \qquad (2)$$

The 4-th lens unit G4 in FIG. 1 corresponds to the rear lens unit $G_R$ in FIG. 5. Therefore, the respective lateral magnifications $\beta_4$ and $\beta_R$ of these lens units G4 and $G_R$ are equal to each other, that is, $\beta_R = \beta_4$. Hence, the image surface sensitivity $\epsilon_{23}$ is given by $$\epsilon_{23} = \beta_R^2 - (\beta_{23}\beta_4)^2 = \epsilon_F - (\beta_{23}\beta_4)^2 \qquad (3)$$

Accordingly, by employing the focusing method of the present invention, the image surface sensitivity $\epsilon_{23}$ of the focusing lens unit can be made smaller than the image surface sensitivity $\epsilon_F$ of the conventional focusing lens unit by $(\beta_{23}\beta_4)^2$.

The shorter the focal length $f_1$ of the 1-st lens unit G1, the larger $\beta_{23}$, and thus $\epsilon_{23}$ can be made smaller. However, if $\epsilon_{23}$ is excessively small, the amount of movement of the 2-nd and 3-rd lens units G2 and G3 for focusing becomes excessively large, and hence the spacing between the 1-st and 2-nd lens units G1 and G2 must be enlarged, which results in an increase in the overall length of the lens system. Accordingly, it is preferable for the focal length $f_1$ of the 1-st lens unit G1 to satisfy the following condition:

$$1.2 < |f_1|/F_W < 1.8 \qquad (9)$$

where $F_W$: the focal length of the entire system at the wide end.

If the lower limit of the condition (9) is not reached, i.e., 1.2 or less, $\epsilon_{23}$ becomes excessively small, resulting in an increase in the overall length of the lens system, as described above. If the upper limit of the condition (9) is exceeded, i.e., 1.8 or more, $\beta_{23}$ cannot be increased. Accordingly, $\epsilon_{23}$ is undesirably large. Thus, it becomes difficult to control the movement of the focusing lens unit at the tele end.

Further, it is preferable, with a view to attaining the object of the present invention, to satisfy the following conditions (10) and (11):

$$0.6 < f_{23}/|f_4| < 1.2 \qquad (10)$$

$$2.5 < \beta_{4T} < 4.0 \qquad (11)$$

where $f_{23}$: the composite focal length of the 2-nd and 3-rd lens units G2 and G3 at the tele end;

$f_4$: the focal length of the 4-th lens unit G4; and $\beta_{4T}$: the lateral magnification of the 4-th lens unit G4 at the tele end.

The condition (10) relates to the composite focal length of the 2-nd and 3-rd lens units G2 and G3. If the composite focal length is shorter than the lower limit of the condition (10), i.e., 0.6 or less, $\beta_{23}$ becomes large. Therefore, the spacing between the 1-st and 2-nd lens units G1 and G2 must be narrowed, and it becomes difficult to ensure the space for the focusing movement of the composite system of the 2-nd and 3-rd lens units G2 and G3. If the composite focal length is longer than the upper limit of the condition (10), i.e., 1.2 or more, the spacing between the 3-rd and 4-th lens units G3 and G4 becomes longer than is needed, resulting in an increase in the overall length of the lens system.

The condition (11) relates to the lateral magnification of the 4-th lens unit G4. If the lateral magnification is smaller than the lower limit of the condition (11), i.e., 2.5 or less, it becomes difficult to ensure the back focus at the wide end, and hence it becomes impossible to attain a zoom ratio of 2 or higher. If the lateral magnification exceeds the upper limit of the condition (11), i.e., 4.0 or more, $\epsilon_{23}$ becomes large, so that it becomes difficult to control the movement of the focusing lens unit at the tele end.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1 schematically shows the optical arrangement of a compact zoom lens system having a high zoom ratio and a wide view angle according to the present invention.

FIGS. 3(a)–3(l) graphically show spherical aberration, astigmatism, distortion, and lateral chromatic aberration at the wide end, FIGS. 3(a)–3(d), the middle focal length position FIGS. 3(e)–3(h), and the tele end, FIGS. 3(i)–3(l) with respect to the infinite object point in Example 1.

FIGS. 8(a)–8(l) graphically shows various aberrations in Example 3 in a similar manner to FIG. 3.

DESCRIPTION OF THE PREFERRED EMBODIMENTS

Examples 1 and 2 of the zoom lens system according to the present invention will be described below.

Figure 2A:
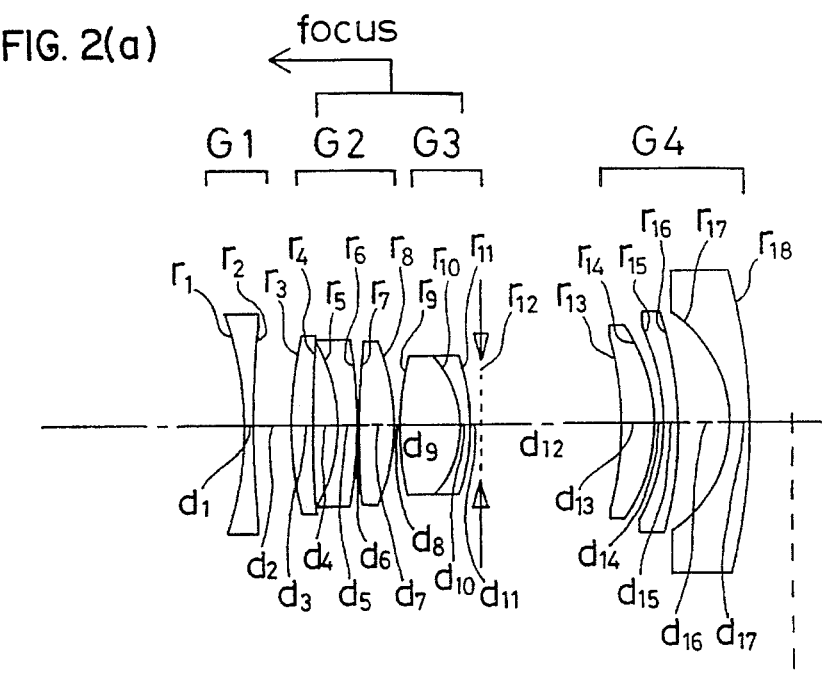
FIGS. 2(a)–2(c) are sectional views showing zoom lens systems of Example 1 in three different positions, that is, the wide end, FIG. 2(a), the middle focal length position FIG. 2(b), and the tele end, FIG. 2(c).
Figure 2B:
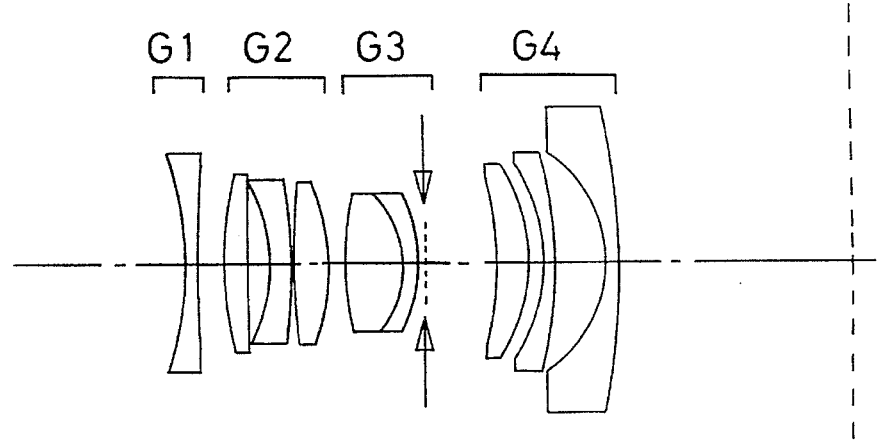
Figure 2C:
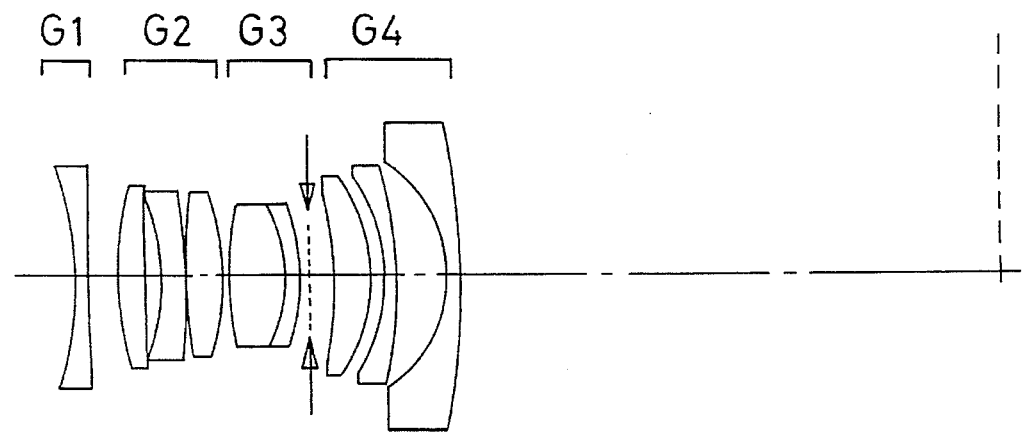
Figure 3A:
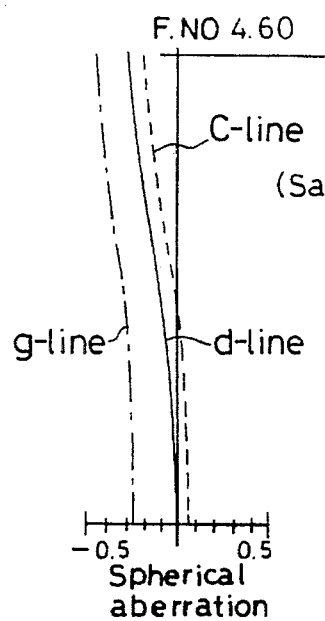
Figure 3B:
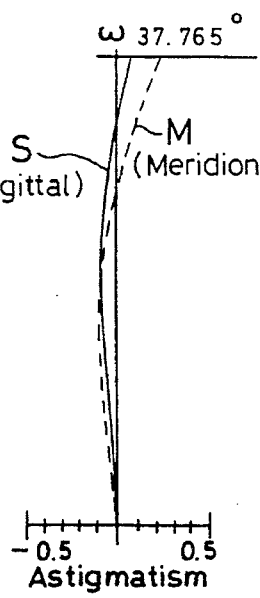
Figure 3C:
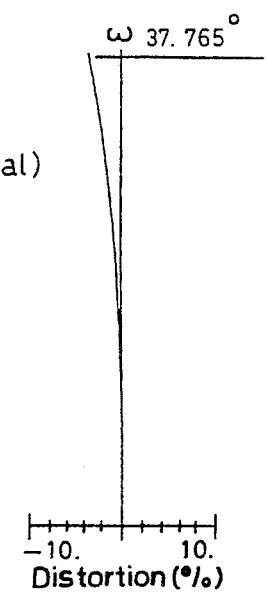
Figure 3D:
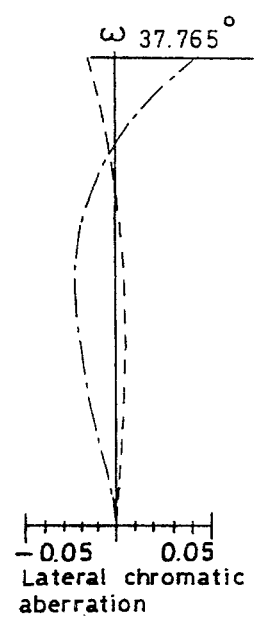
Figure 3E:
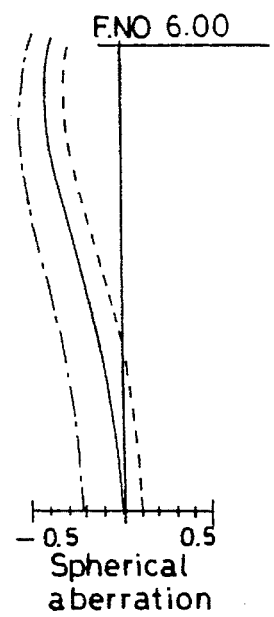
Figure 3F:
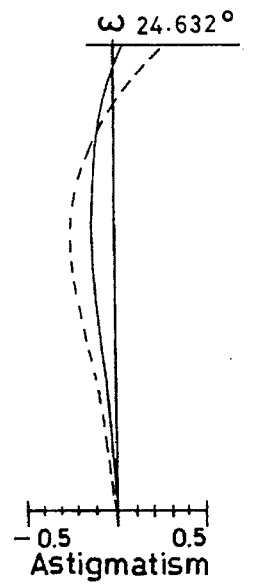
Figure 3G:
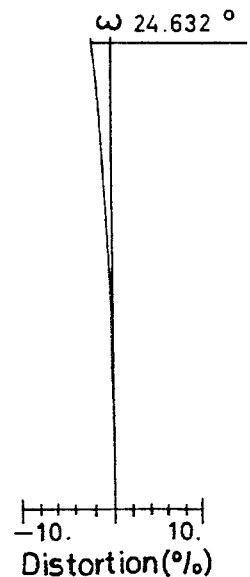
Figure 3H:
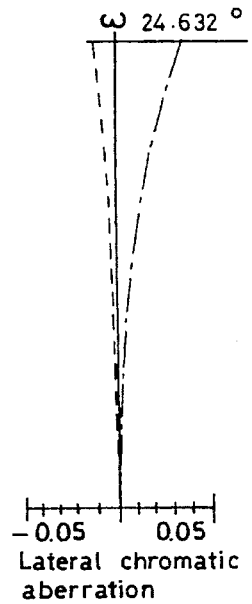
Figure 4A:
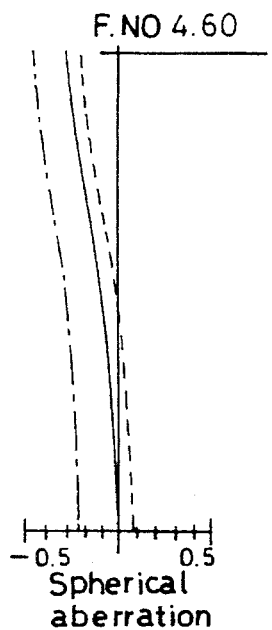
FIGS. 4(a)–4(l) graphically show spherical aberration, astigmatism, distortion, and lateral chromatic aberration at the wide end FIGS. 4(a)–4(d), the middle focal length position, FIGS. 4(e)–4(h) and the tele end, FIGS. 4(i)–4(l) in Example 2.
Figure 4B:
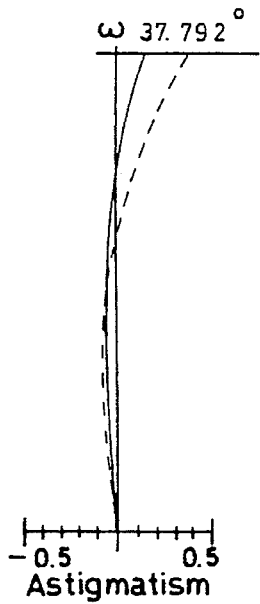
Figure 4C:
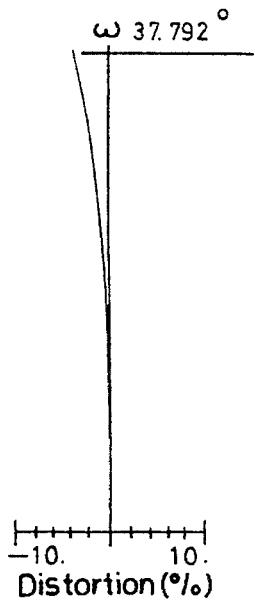
Figure 4D:
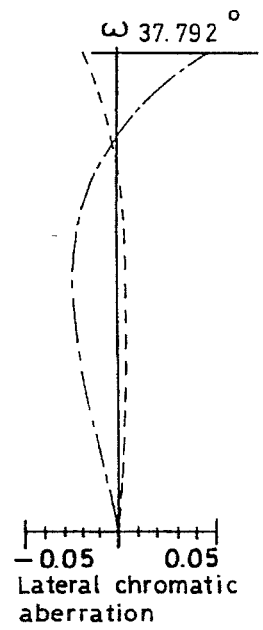
Figure 4E:
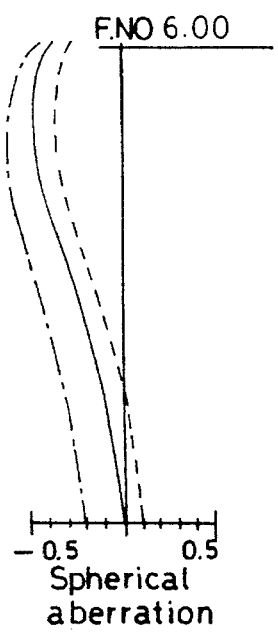
Figure 4F:
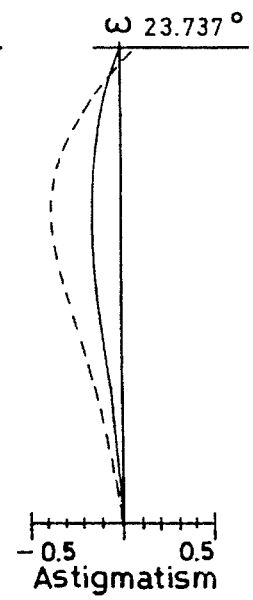
Figure 4G:
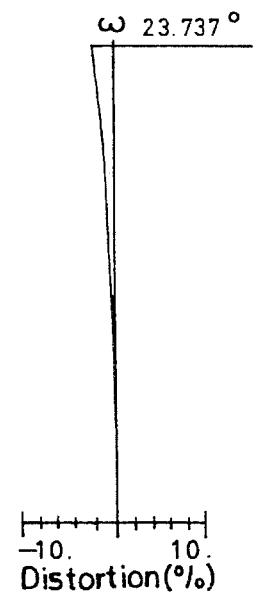
Figure 4H:
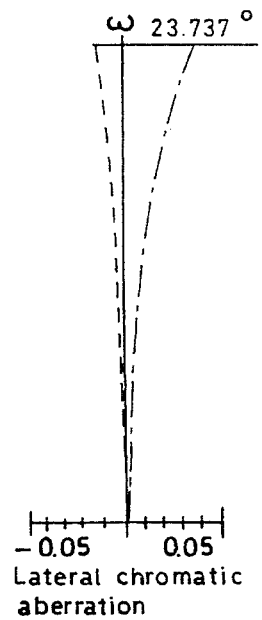
Figure 4I:
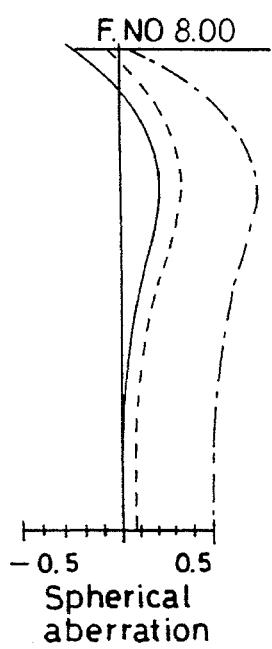
Figure 4J:
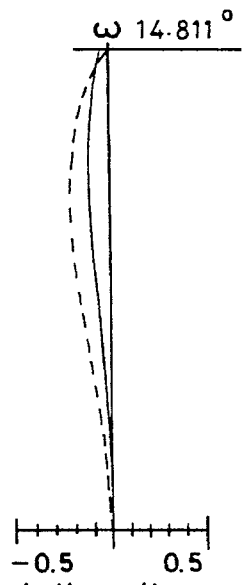
Figure 4K:
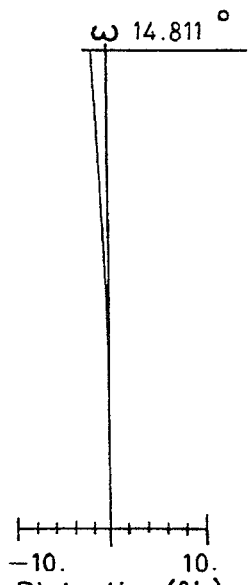
Figure 4L:
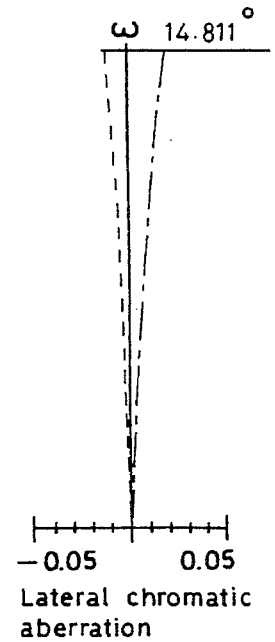

FIG. 2 is a sectional view showing the zoom lens system of Example 1 at the wide end (FIG. 2(a)), the middle focal length position (FIG. 2(b)), and the tele end (FIG. 2(c)). Since the arrangement of Example 2 is similar to that of Example 1, illustration thereof is omitted.

In both Examples 1 and 2, the 1-st lens unit G1 comprises a single double-concave negative lens, and the 2-nd lens unit G2 comprises three lens components, that is, a double-convex positive lens, a negative meniscus lens having a convex surface directed toward the image side, and a double-convex positive lens. The 3-rd lens unit G3 is a cemented lens comprising a double-convex positive lens and a negative meniscus lens having a convex surface directed toward the image side. The 3-rd lens unit G3 has an aperture stop which is integral with it and disposed at the rear end thereof. The 4-th lens unit G4 comprises three lens components, that is, a positive meniscus lens, a negative meniscus lens, and a negative meniscus lens, each having a convex surface directed toward the image side. In both Examples 1 and 2, one aspherical surface is employed to constitute a surface of the 2-nd lens unit G2 that is closest to the image side.

Lens data in Examples 1 and 2 will be described later. FIGS. 3(a)–3(l) and 4(a)–4(l) are graphs showing spherical aberration, astigmatism, distortion, and lateral chromatic aberration at the wide end (FIGS. 3(a)–3(d) and 4(a)–4(d)), the middle focal length position (FIGS. 3(e)–3(n) and 4(e)–4(h)), and the tele end (FIGS. 3(i)–3(l) and 4(i)–4(l)) with respect to the infinite object point in Examples 1 and 2.

The table below comparatively shows the image surface sensitivity $\epsilon_F$ (the conventional focusing method) and the image surface sensitivity $\epsilon_{23}$ (the focusing method of the present invention) for the infinite object point of the focusing lens unit at the tele end in each of Examples 1 and 2.

|  | $\epsilon_F$ | $\epsilon_{23}$ |
|---|---|---|
| Example 1 | 11.76 | 8.16 |
| Example 2 | 13.18 | 8.67 |

Lens data in Examples 1 and 2 are shown below. In the following, reference symbol f denotes the focal length of the entire system, $F_{NO}$ is F-number, $\omega$ is the half view angle, $f_B$ is the back focus, $r_1, r_2 \ldots$ are the curvature radii of lens surfaces, $d_1, d_2 \ldots$ are the spacings between adjacent lens surfaces, $n_{d1}, n_{d2} \ldots$ are the refractive indices of the lenses for the spectral d-line, and $\lambda_{d1}, \lambda_{d2} \ldots$ are the Abbe numbers of the lenses. Assuming that the direction of the optical axis is the x direction and a direction perpendicular to the optical axis is the y direction, the aspherical configuration is expressed by $$x = cy^2/\{1+(1-c^2y^2)^{1/2}\} + A_4 y^4 + A_6 y^6 + A_8 y^8$$

where $c=1/r$, r is the curvature radius on the optical axis, and $A_4$, $A_6$, and $A_8$ are aspherical coefficients.

Example 1 f = 28.84 ~ 48.0 ~ 78.0
$F_{NO}$ = 4.6 ~ 6.0 ~ 8.0
$\omega$ = 37.765 ~ 24.632 ~ 15.646°
$f_B$ = 4.21 ~ 21.48 ~ 51.05

| | | | |
|---|---|---|---|
| $r_1 = -29.935$ | $d_1 = 1.300$ | $n_{d1} = 1.65844$ | $v_{d1} = 50.86$ |
| $r_2 = 276.982$ | $d_2 = $ (Variable) | | |
| $r_3 = 29.323$ | $d_3 = 2.447$ | $n_{d2} = 1.60342$ | $v_{d2} = 38.01$ |
| $r_4 = -875.557$ | $d_4 = 1.912$ | | |
| $r_5 = -17.829$ | $d_5 = 2.088$ | $n_{d3} = 1.83400$ | $v_{d3} = 37.16$ |
| $r_6 = -61.216$ | $d_6 = 0.179$ | | |
| $r_7 = 125.064$ | $d_7 = 3.688$ | $n_{d4} = 1.51633$ | $v_{d4} = 64.15$ |
| $r_8 = -20.368$(Aspheric) | $d_8 = $ (Variable) | | |
| $r_9 = 27.111$ | $d_9 = 5.774$ | $n_{d5} = 1.53996$ | $v_{d5} = 59.57$ |
| $r_{10} = -10.124$ | $d_{10} = 1.200$ | $n_{d6} = 1.80610$ | $v_{d6} = 40.95$ |
| $r_{11} = -18.618$ | $d_{11} = 0.800$ | | |
| $r_{12} = \infty$ (stop) | $d_{12} = $ (Variable) | | |
| $r_{13} = -39.357$ | $d_{13} = 3.517$ | $n_{d7} = 1.59551$ | $v_{d7} = 39.21$ |
| $r_{14} = -14.726$ | $d_{14} = 1.092$ | | |
| $r_{15} = -16.637$ | $d_{15} = 1.193$ | $n_{d8} = 1.74400$ | $v_{d8} = 44.73$ |
| $r_{16} = -43.461$ | $d_{16} = 4.546$ | | |
| $r_{17} = -12.395$ | $d_{17} = 1.800$ | $n_{d9} = 1.69680$ | $v_{d9} = 55.52$ |
| $r_{18} = -62.066$ | | | |

Zooming Spaces

| f | 28.84 | 48.0 | 78.0 |
|---|---|---|---|
| $d_2$ | 3.269 | 2.397 | 3.090 |
| $d_6$ | 0.341 | 1.213 | 0.520 |
| $d_{12}$ | 13.140 | 6.880 | 2.507 |

Aspherical Coefficients

8th surface
$A_4 = 0.10209 \times 10^{-4}$
$A_6 = -0.59663 \times 10^{-8}$
$A_8 = -0.21208 \times 10^{-8}$ Focusing Spaces (when the object distance is one meter)

| f | 28.84 | 48.0 | 78.0 |
|---|---|---|---|

-continued

|  | | | |
|---|---|---|---|
| $d_2$ | 2.441 | 1.489 | 2.212 |
| $d_{11}$ | 1.628 | 1.708 | 1.678 |

$\mid f_1 \mid / F_w = 1.42$
$\mid f_4 \mid / F_w = 0.75$
$f_3/f_2 = 0.54$
$v_{d\,(3P)} - v_{d\,(3N)} = 18.62$
$v_{d\,(4N)} - v_{d\,(4P)} = 10.92$
$\mid (r_1 + r_2)/(r_1 - r_2) \mid = 0.80$
$\mid (r_5 + r_6)/(r_5 - r_6) \mid = 1.82$
$n_{d\,(3N)} - n_{d\,(3P)} = 0.266$
$\mid f_{23}/f_4 \mid = 0.89$
$\beta_{4T} = 3.43$ Example 2

$f = 28.84 \sim 49.98 \sim 82.5$
$F_{NO} = 4.6 \sim 6.0 \sim 8.0$
$\omega = 37.765 \sim 23.737 \sim 14.811°$
$f_B = 4.13 \sim 23.26 \sim 54.91$

| | | | |
|---|---|---|---|
| $r_1 = -32.658$ | $d_1 = 1.300$ | $n_{d1} = 1.65844$ | $v_{d1} = 50.86$ |
| $r_2 = 119.635$ | $d_2 = $ (Variable) | | |
| $r_3 = 28.959$ | $d_3 = 2.802$ | $n_{d2} = 1.60342$ | $v_{d2} = 38.01$ |
| $r_4 = -193.846$ | $d_4 = 1.958$ | | |
| $r_5 = -17.020$ | $d_5 = 2.115$ | $n_{d3} = 1.83400$ | $v_{d3} = 37.16$ |
| $r_6 = -63.355$ | $d_6 = 0.220$ | | |
| $r_7 = 159.253$ | $d_7 = 3.750$ | $n_{d4} = 1.51633$ | $v_{d4} = 64.15$ |
| $r_8 = -19.431$(Aspheric) | $d_8 = $ (Variable) | | |
| $r_9 = 26.696$ | $d_9 = 5.890$ | $n_{d5} = 1.53996$ | $v_{d5} = 59.57$ |
| $r_{10} = -10.193$ | $d_{10} = 1.200$ | $n_{d6} = 1.80610$ | $v_{d6} = 40.95$ |
| $r_{11} = -18.823$ | $d_{11} = 0.800$ | | |
| $r_{12} = \infty$ (stop) | $d_{12} = $ (Variable) | | |
| $r_{13} = -41.680$ | $d_{13} = 3.583$ | $n_{d7} = 1.59551$ | $v_{d7} = 39.21$ |
| $r_{14} = -14.813$ | $d_{14} = 1.127$ | | |
| $r_{15} = -16.380$ | $d_{15} = 1.200$ | $n_{d8} = 1.74400$ | $v_{d8} = 44.73$ |
| $r_{16} = -44.980$ | $d_{16} = 4.517$ | | |
| $r_{17} = -12.606$ | $d_{17} = 1.800$ | $n_{d9} = 1.69680$ | $v_{d9} = 55.52$ |
| $r_{18} = -65.414$ | | | |

Zooming Spaces

| f | 28.84 | 49.98 | 82.5 |
|---|---|---|---|
| $d_2$ | 3.232 | 2.506 | 3.094 |
| $d_8$ | 0.615 | 1.341 | 0.753 |
| $d_{12}$ | 13.380 | 6.687 | 2.450 |

Aspherical Coefficients

8th surface
$A_4 = 0.75716 \times 10^{-5}$
$A_6 = 0.17822 \times 10^{-7}$
$A_8 = -0.22029 \times 10^{-8}$ Focusing Spaces(when the object distance is one meter)

| f | 28.84 | 49.98 | 82.5 |
|---|---|---|---|
| $d_2$ | 2.347 | 1.540 | 2.154 |
| $d_{11}$ | 1.685 | 1.766 | 1.740 |

$\mid f_1 \mid / F_w = 1.35$
$\mid f_4 \mid / F_w = 0.75$
$f_3/f_2 = 0.55$
$v_{d\,(3P)} - v_{d\,(3N)} = 18.62$
$v_{d\,(4N)} - v_{d\,(4P)} = 10.92$
$\mid (r_1 + r_2)/(r_1 - r_2) \mid = 0.57$
$\mid (r_5 + r_6)/(r_5 - r_6) \mid = 1.72$
$n_{d\,(3N)} - n_{d\,(3P)} = 0.266$
$\mid f_{23}/f_4 \mid = 0.90$
$\beta_{4T} = 3.63$ In the foregoing description, a compact zoom lens system of the present invention which comprises four lens units has been discussed. However, the zoom lens system of the present invention may also be arranged as a two-unit type zoom lens system as described below, in which the 1-st to 3-rd lens units in the four-unit type zoom lens system are moved together as one unit during zooming. The purpose, arrangement and advantages of such a two-unit type zoom lens system will be described below. This zoom lens system is a compact zoom lens system for a compact camera which is designed so that a zoom ratio of at least 2 is ensured, and yet the overall length of the lens system is relatively short, and that various aberrations are effectively corrected, and further that the view angle at the wide end can be widened to 70° or more, although it is a two-unit type zoom lens system.

That is, the compact zoom lens system comprises, in order from the object side, a 1-st lens unit having a positive refractive power, and a 2-nd lens unit having a negative refractive power, and effects zooming by varying the spacing between the two lens units. The 1-st lens unit comprises, in order from the object side, a negative lens whose object-side surface has a larger curvature radius than that of the image-side surface thereof, and a positive lens unit including at least one negative lens and at least three positive lenses.

The reason for adopting the above-described arrangement and the function thereof will be explained below.

As shown in FIG. 6, for example, in the zoom lens system comprising two, one positive and one negative, lens units, a negative lens G1F is disposed at a position in the 1-st lens unit G1 which is closest to the object side, thereby shifting the principal point of the 1-st lens unit G1 toward the image side so as to ensure the spacing between the lens units and lengthen the back focus. Thus, it becomes possible to widen the view angle of the zoom lens system. The zoom lens systems disclosed in Japanese Patent Application Laid-Open (KOKAI) Nos. 03-213814 and 03-240013 also employ the above-described technique. In the negative lens used in these conventional zoom lens systems, however, the curvature radius of the image-side surface is made larger than that of the object-side surface, thereby minimizing aberrations caused by the negative lens.

In contrast, the negative lens G1F, which is disposed at the position closest to the object side in the zoom lens system of the present invention, positively uses aberrations occurring therein to thereby effectively correct various aberrations which would otherwise hinder achievement of a reduction in the overall size of the lens system.

For this purpose, the negative lens G1F is formed such that the curvature radius of the object-side surface is larger than that of the image-side surface. Thus, astigmatism and distortion which occur mainly at the object-side surface become relatively large, and it is possible to realize well-balanced correction of various aberrations, particularly astigmatism and distortion, which are largely generated in the negative lens in the 2-nd lens unit G2 when the lens system is reduced in overall size.

The 1-st lens unit G1 further has a positive lens unit G1R disposed in the rear of the negative lens G1F in order to effectively correct spherical aberration. The positive lens unit G1R includes at least three positive lenses and at least one negative lens.

Spherical aberration occurs toward the negative side in the 1-st lens unit G1 and toward the positive side in the 2-nd lens unit G2. However, since the 1-st lens unit G1 is larger than the 2-nd lens unit G2 in the size of the bundle of rays, the spherical aberration occurring in the 1-st lens unit G1 tends to become larger than the spherical aberration in the 2-nd lens unit G2.

Therefore, the spherical aberration occurring in the 1-st lens unit G1 is minimized by using at least three positive lenses and at least one negative lens for the 1-st lens unit G1. Thus, the spherical aberration generated in the 2-nd lens unit G2 can be corrected with good balance. Particularly, fluctuation of spherical aberration due to zooming can be minimized.

Next, various conditions suitable for obtaining an even more compact and high-performance zoom lens system will be explained.

Regarding the power distribution to the lens units, it is preferable to satisfy the following conditions (12) and (13):

$$1.3 < |f_{1F}|/F_W < 1.8 \quad (12)$$

$$0.4 < |f_2|/F_W < 0.9 \quad (13)$$

where $f_{1F}$ . . . the focal length of the 1-st negative lens G1F in the 1-st lens unit G1, $F_W$ . . . the focal length of the entire system at the wide end, and $f_2$ . . . the focal length of the 2-nd lens unit G2.

Condition (12) relates to the 1-st lens G1F having a negative power, which is disposed at a position in the 1-st lens unit G1 which is closest to the object side. If the upper limit of the condition (12) is exceeded, i.e., 1.8 or more, the negative power becomes excessively weak, so that it is difficult to ensure the back focus at the wide end and also difficult to correct astigmatism and distortion. If the lower limit of condition (12) is not reached, i.e., 1.3 or less, the negative power becomes excessively strong. Consequently, the back focus becomes longer than is needed. Alternatively, the spacing between the lens units becomes larger than is needed, inviting an increase in the overall length of the lens system.

Condition (13) relates to the power of the 2-nd lens unit G2. If the upper limit of condition (13) is exceeded, i.e., 0.9 or more, the power of the 2-nd lens unit G2 becomes weak, so that the amount of movement of the 2-nd lens unit G2 for zooming increases, resulting in an increase in the overall length of the lens system. If the lower limit of condition (13) is not reached, i.e., 0.4 or less, astigmatism and distortion occurring in the 2-nd lens unit G2 increase, so that it becomes difficult to correct them by using the astigmatism and distortion generated in the 1-st lens unit G1.

Regarding the configuration of the 1-st negative lens G1F in the 1-st lens unit G1, it is preferable to satisfy the following condition:

$$-2.5 < (r_1 + r_2)/(r_1 - r_2) < -0.5 \quad (14)$$

where $r_1$ . . . the curvature radius of the object-side surface of the 1-st negative lens, and $r_2$ . . . the curvature radius of the image-side surface of the 1-st negative lens.

If the upper limit of condition (14) is exceeded, i.e., −0.5 or more, astigmatism and distortion generated in this negative lens become excessively small. If the lower limit of condition (14) is not reached, i.e., −2.5 or less, the astigmatism and distortion generated in the negative lens become excessively large. Therefore, it is preferable to satisfy condition (14) with a view to correcting astigmatism and distortion with good balance maintained between the aberrations generated in the 1-st lens unit G1 and those in the 2-nd lens unit G2.

With regard to the lens arrangement of the positive lens unit G1R, which is disposed in the rear of the 1-st negative lens G1F in the 1-st lens unit G1, the positive lens unit G1R preferably comprises a positive lens unit which includes, in order from the object side, a positive lens whose object-side surface has a larger curvature radius than that of the image-side surface thereof, a negative lens, a positive lens, a double-convex lens, and a negative meniscus lens and which has a positive refractive power as a whole. With this lens arrangement, spherical aberration and axial chromatic aberration can be effectively corrected.

In addition, if the average refractive index $<n_{d1RP}>$ of the positive lens in the positive lens unit G1R and the average refractive index $<n_{d1RN}>$ of the negative lens satisfy the following conditions, Petzval sum can be minimized, and it becomes easy to correct the field curvature:

$$<n_{d1RP}> < 1.65 \quad (15)$$

$$<n_{d1RN}> > 1.75 \quad (16)$$

Regarding the arrangement of the 2-nd lens unit G2, it comprises at least one positive meniscus lens, and at least two negative lenses. Assuming that the average Abbe number of the positive lens in the 2-nd lens unit G2 is represented by $<v_{d2GP}>$, the average Abbe number of the negative lenses in the 2-nd lens unit G2 by $<v_{d2GN}>$, the Abbe number of the positive lens in the positive lens unit G1R of the 1-st lens unit G1 which is closest to the object side by $v_{d(2)}$, and the average Abbe numbers of the positive and negative lenses in the positive lens unit disposed closest to the image side by $<v_{d(5)P}>$ and $<v_{d(5)N}>$, respectively, the following two conditions should be satisfied:

$$v_{d(2)} < 50 \qquad (17)$$

$$0.5 < ((<v_{d2GN}> - <v_{d2GP}>)/(<v_{d(5)P}> - <v_{d(5)N}>) < 2.10 \qquad (18)$$

If the above two conditions are satisfied, the axial and lateral chromatic aberrations can be corrected with good balance.

If the average Abbe number $v_{d(2)}$ is not smaller than 50, that is, if it is beyond the limit of condition (17), the fluctuation of lateral chromatic aberration due to zooming increases. If the upper limit of condition (18) is exceeded, i.e., 2.0 or more, the fluctuation of lateral chromatic aberration due to zooming increases, whereas, if the lower limit of the condition (18) is not reached, i.e., 0.5 or less, the fluctuation of axial chromatic aberration due to zooming increases.

These conditions contribute to realization of an even more favorable condition in terms of the reduction in the overall length of the lens system, the correction of aberrations, and the suppression of fluctuation of aberrations by applying the conditions to each particular case solely or in combination.

Next, let us examine a focusing method effective for a compact, two-unit type zoom lens system as described above. A large number of two-unit type zoom lens systems having a positive lens unit and a negative lens unit in order from the object side have heretofore been used as zoom lens systems for use with compact cameras having a relatively short back focus (for example, see Japanese Patent Application Laid-Open (KOKAI) Nos. 56-128911, 62-264019 and 63-266413). In such conventional zoom lens systems, focusing from the infinite object point to the closest focusing distance has generally been effected by moving the front, positive lens unit.

Figure 5:
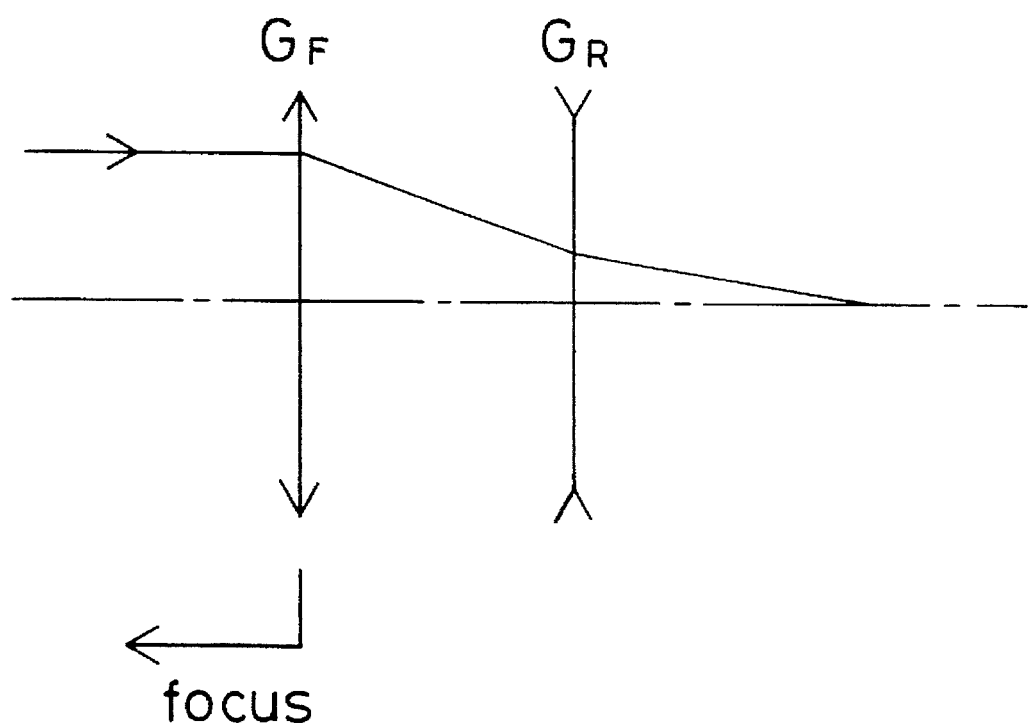
FIG. 5 shows a paraxial optical arrangement to explain a conventional focusing method for a conventional zoom lens system including two, positive and negative, lens units.

FIG. 5 shows a paraxial optical arrangement to explain the conventional focusing method for a conventional two-unit type zoom lens system having a positive front lens unit $G_F$ and a negative rear lens unit $G_R$. If the front lens unit $G_F$ is used as a focusing lens as in the arrangement shown in the figure, the amount of variation of the image surface position with respect to the stopping accuracy of the focusing lens unit, that is, the image surface sensitivity $\epsilon_F$ of the focusing lens unit, is the square of the lateral magnification $\beta_R$ of the rear lens unit $G_R$:

$$\epsilon_F = \beta_R^2 \qquad ①$$

In this case, the object point is considered to be at infinity.

The lateral magnification of the rear lens unit at the tele end increases as the zoom ratio of the zoom lens system becomes higher. Accordingly, the image surface sensitivity of the focusing lens unit at the tele end also increases. Hence, it is necessary to raise the stopping accuracy of the focusing lens unit in conformity to the achievement of a higher zoom ratio, and it becomes difficult to mechanically control the movement of the focusing lens unit.

Figure 6A:
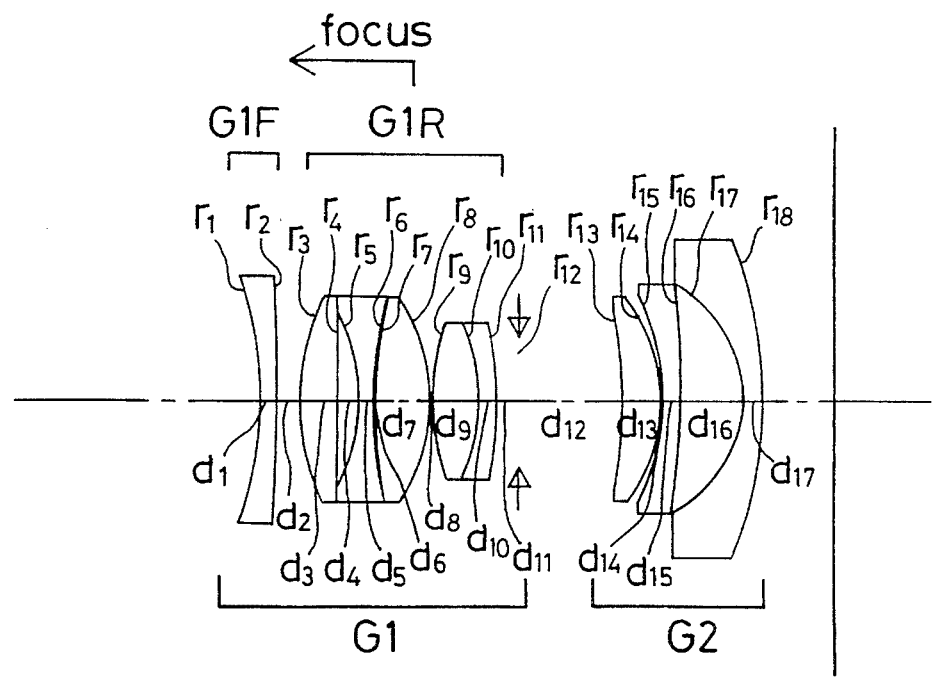
FIGS. 6(a)–6(b) are sectional views showing a zoom lens system of Example 3 at the wide end, FIG. 6(a) and the tele end FIG. 6(b).
Figure 6B:
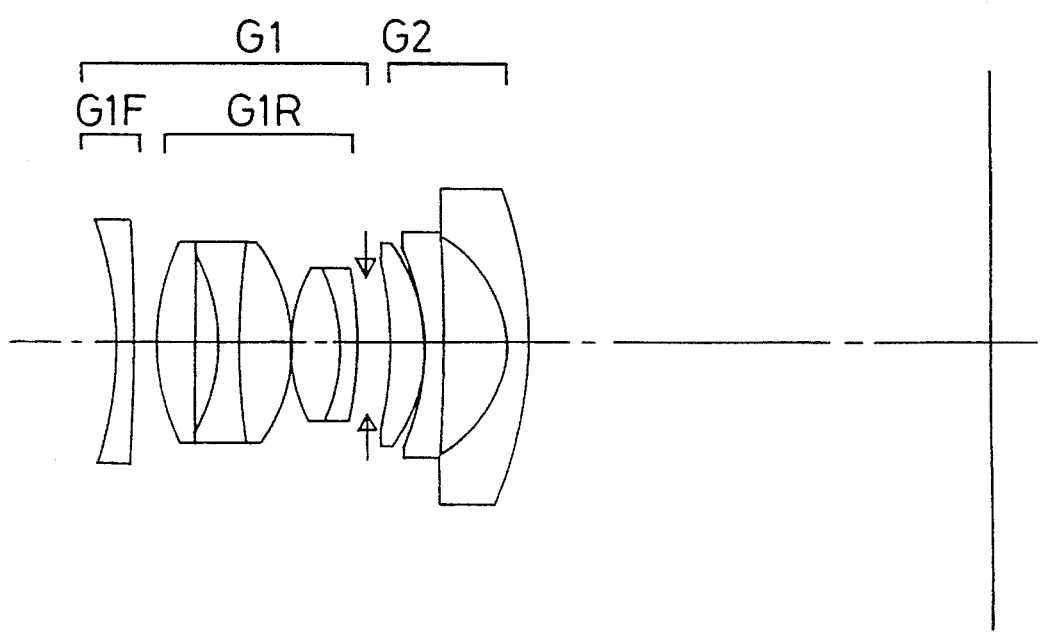

Therefore, let us consider a focusing method whereby the image surface sensitivity of the focusing lens unit in a compact two-unit type zoom lens system as shown in FIGS. 6(a)–6(b) can be adjusted to a level at which it can be mechanically controlled even at the tele end. In the paraxial optical arrangement of the zoom lens system according to the present invention shown in FIGS. 6(a)–6(b), the positive lens unit G1R disposed in the rear of the 1-st negative lens G1F in the 1-st lens unit G1 serves as a focusing lens unit.

Assuming that the lateral magnifications for the infinite object point of the positive lens unit G1R and the 2-nd lens unit G2 are $\beta_{1R}$ and $\beta_2$, respectively, the image surface sensitivity $\epsilon_{1R}$ for the infinite object point of the positive lens unit G1R as a focusing lens unit is given by $$\epsilon_{1R} = \beta_2^2 - (\beta_{1R}\beta_2)^2 \qquad ②'$$

The 2-nd lens unit G2 in FIG. 6 corresponds to the rear lens unit $G_R$ in FIG. 5. Therefore, the respective lateral magnifications $\beta_2$ and $\beta_R$ of these lens units G2 and $G_R$ are equal to each other, that is, $\beta_R = \beta_2$. Hence, the image surface sensitivity $\epsilon_{1R}$ is given by $$\epsilon_{1R} = \beta_R^2 - (\beta_{1R}\beta_2)^2 = \epsilon_F - (\beta_{1R}\beta_2)^2 \qquad ③'$$

Accordingly, by employing the focusing method of the present invention, the image surface sensitivity $\epsilon_{1R}$ of the focusing lens unit can be made smaller than the image surface sensitivity $\epsilon_F$ of the conventional focusing lens unit by $(\beta_{1R}\beta_2)^2$.

The shorter the focal length $f_{1F}$ of the 1-st negative lens G1F in the 1-st lens unit G1, the larger $\beta_{1R}$, and thus $\epsilon_{1R}$ can be made smaller. However, if $\epsilon_{1R}$ is excessively small, the amount of movement of the positive lens unit G1R for focusing becomes excessively large, and hence the spacing between the two lens units G1F and G1R in the 1-st lens unit G1 must be enlarged, which results in an increase in the overall length of the lens system. Accordingly, it is preferable for the focal length $f_{1F}$ of the 1-st negative lens G1F in the 1-st lens unit G1 to satisfy the following condition:

$$1.2 < |f_{1F}|/F_W < 1.8 \qquad ④'$$

where $F_W$ is the focal length of the entire system at the wide end.

If the lower limit of condition ④' is not reached, i.e., 1.2 or less, $\epsilon_{1R}$ becomes excessively small, resulting in an increase in the overall length of the lens system, as described above. If the upper limit of condition ④' is exceeded, i.e., 1.8 or more, $\beta_{1R}$ cannot be increased. Accordingly, $\epsilon_{1R}$ is undesirably large. Thus, it becomes difficult to control the movement of the focusing lens unit at the tele end.

Further, it is preferable, with a view to attaining the object of the present invention, to satisfy following conditions ⑤' and ⑥':

$$0.6 < f_{1R}/|f_2| < 1.2 \qquad ⑤'$$

$$2.5 < \beta_{2T} < 4.0 \qquad ⑥'$$

where $f_{1R}$: the focal length of the positive lens unit G1R in the 1-st lens unit G1 at the tele end;

$f_2$: the focal length of the 2-nd lens unit G2; and $\beta_{2T}$: the lateral magnification of the 2-nd lens unit G2 at the tele end.

Condition ⑤' relates to the focal length of the positive lens unit G1R in the 1-st lens unit G1. If the focal length of the positive lens unit G1R is shorter than the lower limit of condition ⑤', i.e., 0.6 or less, $\beta_{1R}$ becomes large. Therefore, the spacing between the 1-st negative lens G1F and the positive lens unit G1R must be narrowed, and it becomes difficult to ensure the space for the focusing movement of the positive lens unit G1R. If the focal length of the positive lens unit G1R is longer than the upper limit of condition ⑤', i.e., 1.2 or more, the spacing between the positive lens unit G1R and the 2-nd lens unit G2 becomes longer than is needed, resulting in an increase in the overall length of the lens system.

Condition ⑥' relates to the lateral magnification of the 2-nd lens unit G2. If the lateral magnification is smaller than the lower limit of condition ⑥', i.e., 2.5 or less, it becomes difficult to ensure the back focus at the wide end, and hence it becomes impossible to attain a zoom ratio of 2 or higher. If the lateral magnification exceeds the upper limit of condition ⑥', i.e., 4.0 or more, $\epsilon_2$ becomes large, so that it becomes difficult to control the movement of the focusing lens unit at the tele end.

Examples 3 and 4 of the two-unit type zoom lens system will be described below.

FIGS. 6(a)–6(b) are sectional views showing the zoom lens system of Example 3 at the wide end (FIG. 6(a)) and the tele end (FIG. 6(b)). The lens arrangement of Example 3 is as follows: The 1-st negative lens G1F in the 1-st lens unit G1 comprises a single negative meniscus lens having a concave surface directed toward the object side. The positive lens unit G1R, which is disposed in the rear of the 1-st negative lens G1F in the 1-st lens unit G1, comprises five lens components, that is, a double-convex lens, a double-concave lens, a double-convex lens, and a combination of a double-convex lens and a negative meniscus lens having a concave surface directed toward the object side, which are cemented together. The positive lens unit G1R is followed by an aperture stop. The 2-nd lens unit G2 comprises three lens components, that is, a positive meniscus lens having a concave surface directed toward the object side, and two negative meniscus lenses each having a concave surface directed toward the object side.

Lens data in Example 3 is described later. FIGS. 8(a)–8(l) graphically show spherical aberration, astigmatism, distortion, and lateral chromatic aberration at the wide end FIGS. 8(a)–8(b), the middle focal length position FIGS. 8(e)–8(h), and the tele end FIGS. 8(i)–8(l) with respect to the infinite object point in Example 3.

Figure 7A:
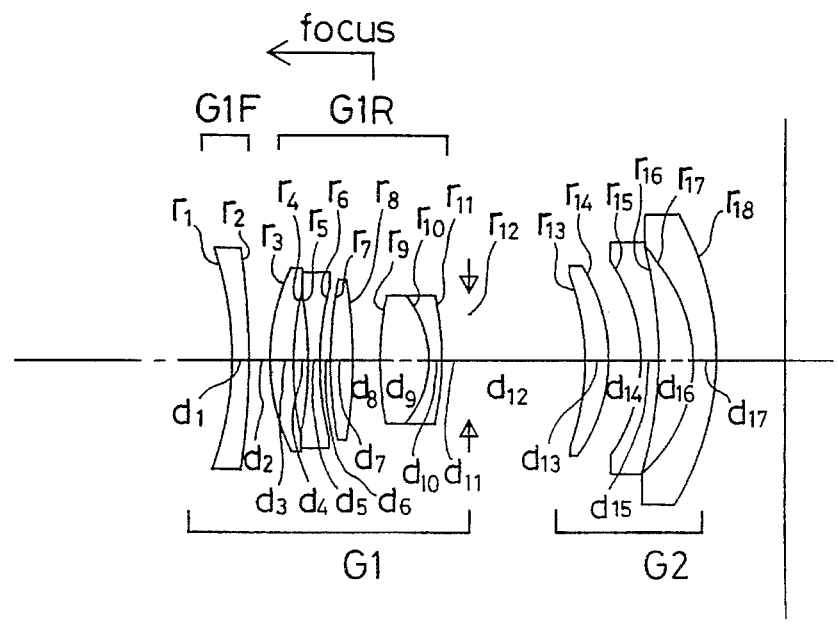
FIGS. 7(a)–7(b) sectional views showing a zoom lens system of Example 4 at the wide end, FIG. 7(a) and the tele end, FIG. 7(b).
Figure 7B:
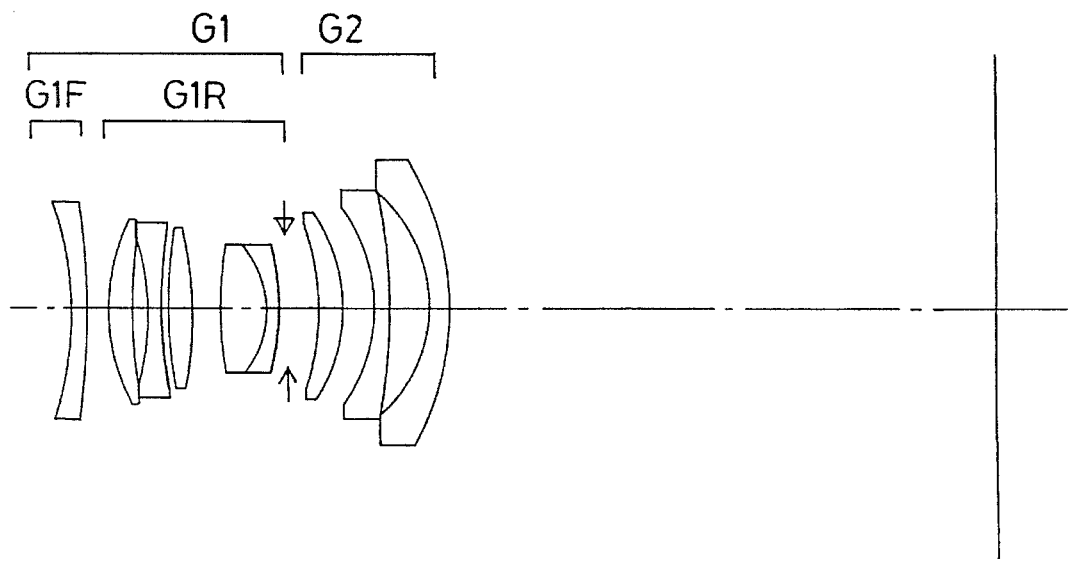
Figure 9A:
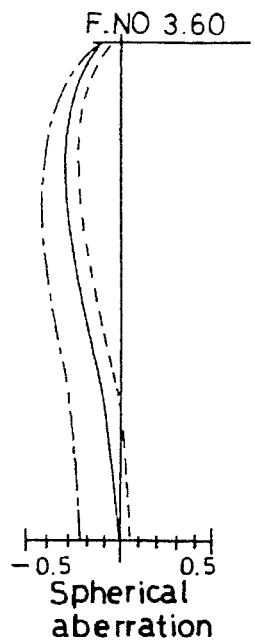
FIGS. 9(a)–9(l) graphically show various aberrations in Example 4 in a similar manner to FIG. 3.
Figure 9B:
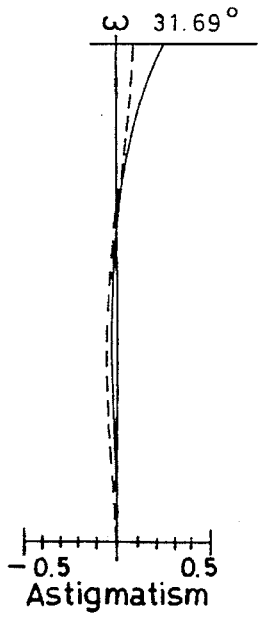
Figure 9C:
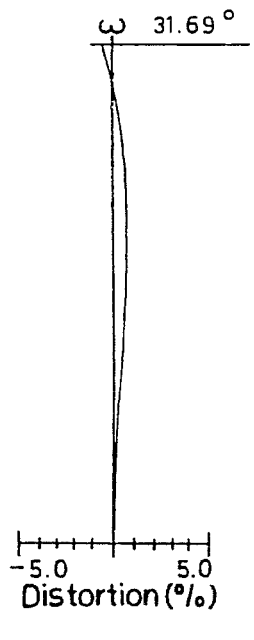
Figure 9D:
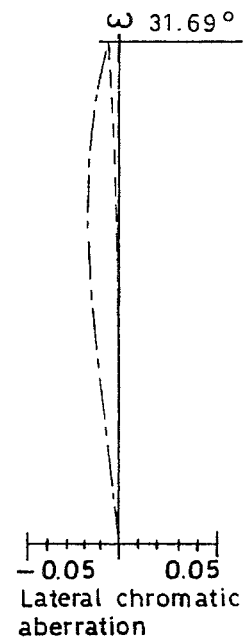
Figure 9E:
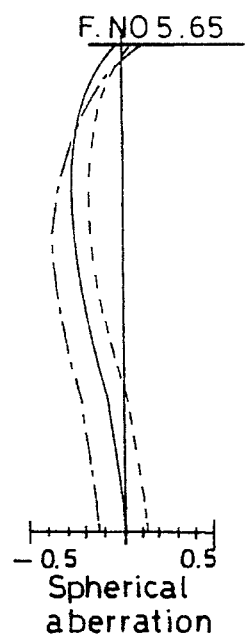
Figure 9F:
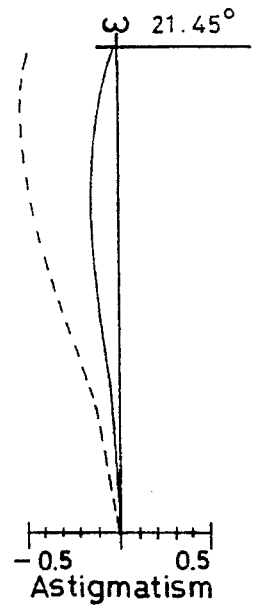
Figure 9G:
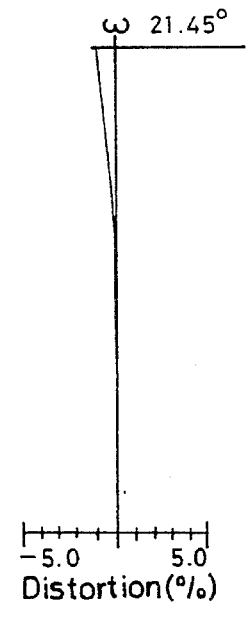
Figure 9H:
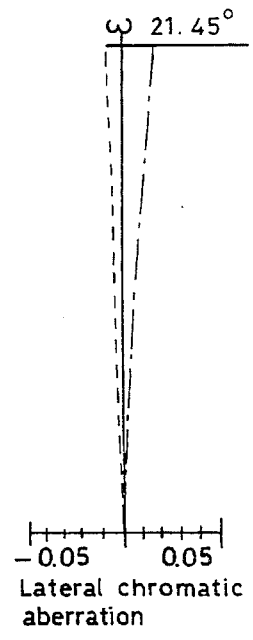
Figure 9I:
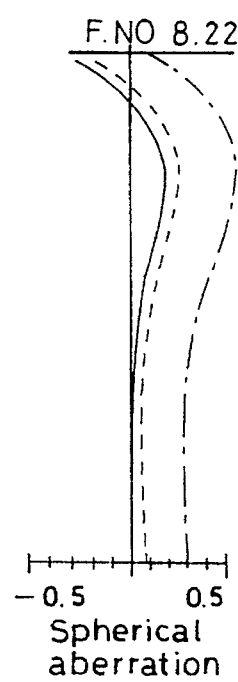
Figure 9J:
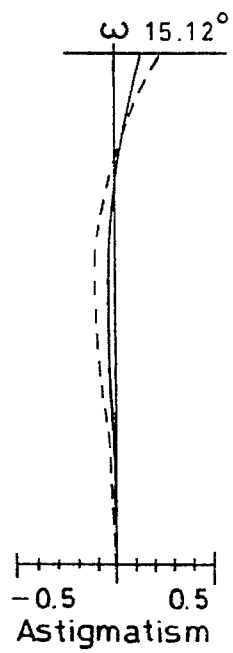
Figure 9K:
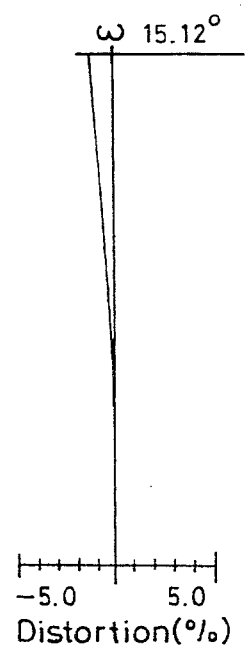
Figure 9L:
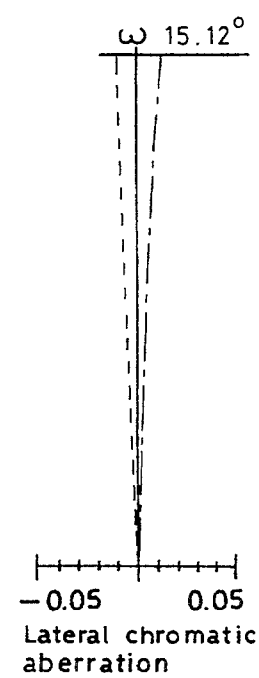

FIGS. 7(a) and 7(b) sectional views showing the zoom lens system of Example 4 at the wide end (FIG. 7(a)) and the tele end (FIG. 7(b)). In this Example, an aspherical surface is used as the 6-th surface (the image-side surface of the 3-rd double-convex lens from the object side) in the positive lens unit G1R. The lens arrangement of Example 4 is as follows. The 1-st negative lens G1F in the 1-st lens unit G1 comprises a single negative meniscus lens having a concave surface directed toward the object side. The positive lens unit G1R, which is disposed in the rear of the 1-st negative lens G1F in the 1-st lens unit G1, comprises five lens components, that is, a positive meniscus lens having a convex surface directed toward the object side, a double-concave lens, a double-convex lens, and a combination of a double-convex lens and a negative meniscus lens having a concave surface directed toward the object side, which are cemented together. The positive lens unit G1R is followed by an aperture stop. The 2-nd lens unit G2 comprises three lens components, that is, a positive meniscus lens having a concave surface directed toward the object side, and two negative meniscus lenses each having a concave surface directed toward the object side.

Lens data in Example 4 will be described later. FIGS. 9(a)–9(l) graphically show spherical aberration, astigmatism, distortion, and lateral chromatic aberration at the wide end FIGS. 9(a)–9(d), the middle focal length position FIGS. 9(e)–9(h), and the tele end FIGS. 9(i)–9(l) with respect to the infinite object point in Example 4.

Table below comparatively shows the image surface sensitivity $\epsilon_F$ (the conventional focusing method) and the image surface sensitivity $\epsilon_{1R}$ (the focusing method of the present invention) for the infinite object point of the focusing lens unit at the tele end in each of Examples 3 and 4.

|  | $\epsilon_F$ | $\epsilon_{1R}$ |
| --- | --- | --- |
| Example 3 | 8.30 | 6.61 |
| Example 4 | 10.38 | 8.59 |

Lens data in Examples 3 and 4 will be shown below. In the following, reference symbol f denotes the focal length of the entire system, $F_{NO}$ is F-number, $\omega$ is the half view angle, $f_B$ is the back focus, $r_1, r_2 \ldots$ are the curvature radii of lens surfaces, $d_1, d_2 \ldots$ are the spacings between adjacent lens surfaces, $n_{d1}, n_{d2} \ldots$ are the refractive indices of the lenses for the spectral d-line, and $v_{d1}, v_{d2} \ldots$ are the Abbe numbers of the lenses. Assuming that the direction of the optical axis is x and a direction perpendicular to the optical axis is y, the aspherical configuration is expressed by $$x = cy^2/\{1+(1-c^2y^2)^{1/2}\} + A_4y^4 + A_6y^6 + A_8y^8$$

where c=1/r, r is the curvature radius on the optical axis, and $A_4$, $A_6$, and $A_8$ are aspherical coefficients.

Example 3 f = 28.51 ~ 40.00 ~ 60.00
$F_{NO}$ = 3.58 ~ 5.02 ~ 7.53
$\omega$ = 37.12 ~ 28.84 ~ 20.09°
$f_B$ = 5.31 ~ 16.23 ~ 35.24

| | | | |
|---|---|---|---|
| $r_1$ = −25.388 | $d_1$ = 1.32 | $n_{d1}$ = 1.65844 | $v_{d1}$ = 50.86 |
| $r_2$ = −156.695 | $d_2$ = 1.80 | | |
| $r_3$ = 19.750 | $d_3$ = 2.94 | $n_{d2}$ = 1.60342 | $v_{d2}$ = 38.01 |
| $r_4$ = −146.970 | $d_4$ = 1.72 | | |
| $r_5$ = −15.786 | $d_5$ = 1.22 | $n_{d3}$ = 1.80100 | $v_{d3}$ = 34.97 |
| $r_6$ = 35.907 | $d_6$ = 0.11 | | |
| $r_7$ = 41.019 | $d_7$ = 4.42 | $n_{d4}$ = 1.58913 | $v_{d4}$ = 61.18 |
| $r_8$ = −13.393 | $d_8$ = 0.10 | | |
| $r_9$ = 18.228 | $d_9$ = 3.80 | $n_{d5}$ = 1.57099 | $v_{d5}$ = 50.80 |
| $r_{10}$ = −11.757 | $d_{10}$ = 1.20 | $n_{d6}$ = 1.78590 | $v_{d6}$ = 44.18 |
| $r_{11}$ = −34.270 | $d_{11}$ = 0.80 | | |
| $r_{12}$ = ∞ (Stop) | $d_{12}$ = (Variable) | | |

| | | | |
|---|---|---|---|
| $r_{13} = -49.372$ | $d_{13} = 3.30$ | $n_{d7} = 1.63930$ | $v_{d7} = 44.88$ |
| $r_{14} = -12.430$ | $d_{14} = 0.10$ | | |
| $r_{15} = -15.452$ | $d_{15} = 1.20$ | $n_{d8} = 1.65844$ | $v_{d8} = 50.86$ |
| $r_{16} = -152.470$ | $d_{16} = 4.94$ | | |
| $r_{17} = -9.446$ | $d_{17} = 1.80$ | $n_{d9} = 1.69680$ | $v_{d9} = 55.52$ |
| $r_{18} = -31.784$ | | | |

Zooming Spaces

| f | 28.51 | 40.00 | 60.00 |
|---|---|---|---|
| $d_{12}$ | 9.082 | 4.927 | 1.491 |

Focusing Spaces (when the object distance is one meter)

| f | 28.51 | 40.00 | 60.00 |
|---|---|---|---|
| $d_2$ | 1.20 | 1.20 | 1.19 |
| $d_{11}$ | 1.40 | 1.40 | 1.41 |

$| f_{1F} |/F_w = 1.62$
$| f_2 |/F_w = 0.69$
$| (r_1 + r_2)/(r_1 - r_2) | = -1.39$
$<n_{d1RP}> = 1.59$
$<n_{d1RN}> = 1.79$
$v_{d(2)} = 38.01$
$( <v_{d2GN}> - <v_{d2GP}> )/( <v_{d(5)P}> - <v_{d(5)N}> ) = 1.25$
$f_{1R}/| f_2 | = 0.89$
$\beta_{2T} = 2.88$ Example 4

$f = 34.994 \sim 54.96 \sim 79.92$
$F_{NO} = 3.60 \sim 5.65 \sim 8.22$
$\omega = 31.69 \sim 21.45 \sim 15.12°$
$f_B = 6.08 \sim 24.65 \sim 47.86$

| | | | |
|---|---|---|---|
| $r_1 = -26.612$ | $d_1 = 1.30$ | $n_{d1} = 1.65830$ | $v_{d1} = 57.33$ |
| $r_2 = -84.007$ | $d_2 = 1.80$ | | |
| $r_3 = 17.236$ | $d_3 = 2.34$ | $n_{d2} = 1.66892$ | $v_{d2} = 44.98$ |
| $r_4 = 47.927$ | $d_4 = 1.20$ | | |
| $r_5 = -43.062$ | $d_5 = 1.20$ | $n_{d3} = 1.80100$ | $v_{d3} = 34.97$ |
| $r_6 = 38.181$ | $d_6 = 0.70$ | | |
| $r_7 = 51.336$ | $d_7 = 2.16$ | $n_{d4} = 1.57250$ | $v_{d4} = 57.76$ |
| $r_8 = -39.936$ (Aspheric) | $d_8 = 2.40$ | | |
| $r_9 = 31.441$ | $d_9 = 4.38$ | $n_{d5} = 1.61765$ | $v_{d5} = 55.05$ |
| $r_{10} = -8.940$ | $d_{10} = 1.20$ | $n_{d6} = 1.79952$ | $v_{d6} = 42.24$ |
| $r_{11} = -18.730$ | $d_{11} = 0.80$ | | |
| $r_{12} = \infty$ (Stop) | $d_{12} =$ (Variable) | | |
| $r_{13} = -20.146$ | $d_{13} = 2.04$ | $n_{d7} = 1.66998$ | $v_{d7} = 39.27$ |
| $r_{14} = -13.667$ | $d_{14} = 2.82$ | | |
| $r_{15} = -13.740$ | $d_{15} = 1.20$ | $n_{d8} = 1.63854$ | $v_{d8} = 55.38$ |
| $r_{16} = -52.693$ | $d_{16} = 3.61$ | | |
| $r_{17} = -12.882$ | $d_{17} = 1.80$ | $n_{d9} = 1.69680$ | $v_{d9} = 55.52$ |
| $r_{18} = -26.219$ | | | |

Zooming Spaces

| f | 34.99 | 54.96 | 79.92 |
|---|---|---|---|
| $d_{12}$ | 11.886 | 5.946 | 2.697 |

Aspherical Coefficients

8th surface
$A_4 = 1.8719 \times 10^{-5}$
$A_6 = 1.4994 \times 10^{-7}$
$A_8 = -6.9203 \times 10^{-9}$ Focusing Spaces (when the object distance is one meter)

| f | 34.99 | 54.96 | 79.92 |
|---|---|---|---|
| $d_2$ | 0.98 | 0.97 | 0.95 |
| $d_{11}$ | 1.62 | 1.63 | 1.65 |

$| f_{1F} |/F_w = 1.7$
$| f_2 |/F_w = 0.66$
$| (r_1 + r_2)/(r_1 - r_2) | = -1.93$
$<n_{d1RP}> = 1.62$
$<n_{d1RN}> = 1.80$
$v_{d(2)} = 44.98$
$( <v_{d2GN}> - <v_{d2GP}> )/( <v_{d(5)P}> - <v_{d(5)N}> ) = 1.26$
$f_{1R}/| f_2 | = 0.91$
$\beta_{2T} = 3.22$ As will be clear from the foregoing description, it is possible according to the present invention to obtain a compact zoom lens system suitable for use with a compact camera or the like, which has a view angle of 70° or more at the wide end and a zoom ratio of 2.5 or higher and in which various aberrations, particularly field curvature, distortion, axial and lateral chromatic aberrations, are effectively corrected over the entire zoom range, from the wide end to the tele end.

What we claim is:

1. A compact wide-angle zoom lens system comprising, in order from the object side:

a first lens unit having a negative refractive power, a second lens unit having a positive refractive power, which is disposed to face said first lens unit across an air spacing, a third lens unit having a positive refractive power, which is disposed to face said second lens unit across an air spacing, and a fourth lens unit having a negative refractive power, which is disposed to face said third lens unit across an air spacing, wherein, during zooming from a wide end to a tele end, said first and third lens units move together as one unit toward the object side, while said second lens unit moves so that, during its movement from the wide end to a middle focal length position, the spacing between said first and second lens units decreases, whereas, during its movement from the middle focal length position to the tele end, the spacing between said second and third lens units decreases, and said fourth lens unit moves so that the spacing between said fourth lens unit and said third lens unit decreases.

2. A compact wide-angle zoom lens systems comprising, in order from the object side:

a first lens unit having a negative refractive power, a second lens unit having a positive refractive power, which is disposed to face said first lens unit across an air spacing, a third lens unit having a positive refractive power, which is disposed to face said second lens unit across an air spacing, an aperture stop, and a fourth lens unit having a negative refractive power, which is disposed to face said third lens unit across an air spacing and said aperture stop, wherein, during zooming from a wide end to a tele end, said first and third lens units move together as one unit toward the object side, while said aperture stop moves together with said third lens unit, and said fourth lens unit moves so that the spacing between said fourth lens unit and said third lens unit decreases.

3. A compact wide-angle zoom lens system according to claim 1 or 2, wherein said third lens unit comprises one double-convex lens, and one negative meniscus lens.

4. A compact wide-angle zoom lens system according to claim 3, wherein said third lens unit satisfies the following condition (4):

$$15 < v_{d(3P)} - v_{d(3N)} < 22 \tag{4}$$

where $v_{d(3N)}$ is an average Abbe number of the negative lens in said third lens unit, and $v_{d(3P)}$ is an average Abbe number of the positive lens in said third lens unit.

5. A compact wide-angle zoom lens system according to claim 1 or 2, wherein said fourth lens unit comprises one positive meniscus lens, and one negative meniscus lens.

6. A compact wide-angle zoom lens system according to claim 5, wherein said fourth lens unit satisfies the following condition (5):

$$7 < v_{d(4N)} - v_{d(4p)} < 14 \tag{5}$$

where $v_{d(4N)}$ is an average Abbe number of the negative lens in said fourth lens unit, and $v_{d(4P)}$ is an average Abbe number of the positive lens in said fourth lens unit.

7. A compact wide-angle zoom lens system according to claim 1 or 2, wherein said first lens unit comprises one negative lens.

8. A compact wide-angle zoom lens system according to claim 7, which satisfies the following condition (6):

$$0.3 < |(r_1 + r_2)/(r_1 - r_2)| < 1.0 \tag{6}$$

where $r_1$ and $r_2$ are the respective curvature radii of object- and image-side surfaces of the negative lens in said first lens unit.

9. A compact wide-angle zoom lens system according to claim 1 or 2, wherein said second lens unit comprises one negative meniscus lens.

10. A compact wide-angle zoom lens system according to claim 9, which satisfies the following condition (7):

$$1.4 < |(r_5 + r_6)/(r_5 - r_6)| < 2.2 \tag{7}$$

where $r_5$ and $r_6$ are the respective curvature radii of object- and image-side surfaces of the negative meniscus lens in said second lens unit.

11. A compact wide-angle zoom lens system according to claim 3, wherein the double-convex lens and the negative meniscus lens in said third lens unit are cemented together.

12. A compact wide-angle zoom lens system according to claim 11, wherein said third lens unit satisfies the following condition (8):

$$n_{d(3N)} - n_{d(3P)} > 0.24 \tag{8}$$

where $n_{d(3N)}$ is the refractive index of the negative meniscus lens in said third lens unit G3, and $n_{d(3P)}$ is the refractive index of the double-convex positive lens in said third lens unit G3.

13. A compact wide-angle zoom lens system according to claim 1 or 2, wherein said second lens unit has such an aspherical surface that the negative power becomes stronger as the distance from the optical axis increases toward the periphery.

14. A compact wide-angle zoom lens system according to claim 1 or 2, wherein said third lens unit has such an aspherical surface that the negative power becomes stronger as the distance from the optical axis increases toward the periphery.

15. A compact wide-angle zoom lens systems comprising, in order from the object side:

a first lens unit having a negative refractive power, a second lens unit having a positive refractive power, which is disposed to face said first lens unit across an air spacing, a third lens unit having a positive refractive power, which is disposed to face said second lens unit across an air spacing, and a fourth lens unit having a negative refractive power, which is disposed to face said third lens unit across an air spacing, wherein, during zooming from a wide end to a tele end, said first and third lens units move together as one unit toward the object side, while said second lens unit moves so that, during its movement from the wide end to a middle focal length position, the spacing between said first and second lens units decreases, whereas, during its movement from the middle focal length position to the tele end, the spacing between said second and third lens units decreases, and said fourth lens unit moves so that the spacing between said fourth lens unit and said third lens unit decreases, and wherein said compact wide-angle zoom lens system satisfies the following condition (1):

$$1.2 < |f_1|/F_W < 1.6 \qquad (1)$$

where $F_W$ is the focal length of the entire system at the wide end, and $f_1$ is the focal length of said first lens unit.

16. A compact wide-angle zoom lens system comprising, in order from the object side:

a first lens unit having a negative refractive power, a second lens unit having a positive refractive power, which is disposed to face said first lens unit across an air spacing, a third lens unit having a positive refractive power, which is disposed to face said second lens unit across an air spacing, and a fourth lens unit having a negative refractive power, which is disposed to face said third lens unit across an air spacing, wherein, during zooming from a wide end to a tele end, said first and third lens units move together as one unit toward the object side, while said second lens unit moves so that, during its movement from the wide end to a middle focal length position, the spacing between said first and second lens units decreases, whereas, during its movement from the middle focal length position to the tele end, the spacing between said second and third lens units decreases, and said fourth lens unit moves so that the spacing between said fourth lens unit and said third lens unit decreases, and wherein said compact wide-angle zoom lens system satisfies the following condition (2)):

$$0.5 < |f_4|/F_W < 1.0 \qquad (2)$$

where $F_W$ is the focal length of the entire system at the wide end, and $f_4$ is the focal length of said fourth lens unit.

17. A compact wide-angle zoom lens system comprising, in order from the object side:

a first lens unit having a negative refractive power, a second lens unit having a positive refractive power, which is disposed to face said first lens unit across an air spacing, a third lens unit having a positive refractive power, which is disposed to face said second lens unit across an air spacing, and a fourth lens unit having a negative refractive power, which is disposed to face said third lens unit across an air spacing, wherein, during zooming from a wide end to a tele end, said first and third lens units move together as one unit toward the object side, while said second lens unit moves so that, during its movement from the wide end to a middle focal length position, the spacing between said first and second lens units decreases, whereas, during its movement from the middle focal length position to the tele end, the spacing between said second and third lens units decreases, and said fourth lens unit moves so that the spacing between said fourth lens unit and said third lens unit decreases, and wherein said compact wide-angle zoom lens system satisfies the following condition (3):

$$0.4 < f_3/f_2 < 0.7 \qquad (3)$$

where $f_2$ is the focal length of said second lens unit, and $f_3$ is the focal length of said third lens unit.

18. A compact wide-angle zoom lens system comprising, in order from the object side:

a first lens unit having a negative refractive power, a second lens unit having a positive refractive power, which is disposed to face said first lens unit across an air spacing, a third lens unit having a positive refractive power, which is disposed to face said second lens unit across an air spacing, and a fourth lens unit having a negative refractive power, which is disposed to face said third lens unit across an air spacing, wherein, during zooming from a wide end to a tele end, said first and third lens units move together as one unit toward the object side, while said second lens unit moves so that, during its movement from the wide end to a middle focal length position, the spacing between said first and second lens units decreases, whereas, during its movement from the middle focal length position to the tele end, the spacing between said second and third lens units decreases, and said fourth lens unit moves so that the spacing between said fourth lens unit and said third lens unit decreases, and wherein focusing from an infinite object point to a closest focusing distance is effected by moving said second and third lens units together as one unit toward the object side.

19. A compact wide-angle zoom lens system comprising, in order from the object side:

a first lens unit having a negative refractive power, a second lens unit having a positive refractive power, which is disposed to face said first lens unit across an air spacing, a third lens unit having a positive refractive power, which is disposed to face said second lens unit across an air spacing, an aperture stop, and a fourth lens unit having a negative refractive power, which is disposed to face said third lens unit across an air spacing and said aperture stop, wherein, during zooming from a wide end to a tele end, said first and third lens units move together as one unit toward the object side, while said aperture stop moves together with said third lens unit, and said fourth lens unit moves so that the spacing between said fourth lens unit and said third lens unit decreases, and wherein focusing from an infinite object point to a closest focusing distance is effected by moving said second and third lens units together as one unit toward the object side.

20. A compact wide-angle zoom lens system according to claim 18 or 19, which satisfies the following condition (9):

$$1.2 < |f_1|/F_W < 1.8 \qquad (9)$$

where $F_W$ is the focal length of the entire system at the wide end, and $f_1$ is the focal length of said first lens unit.

21. A compact wide-angle zoom lens system according to claim 18 or 19, which satisfies the following condition (10):

$$0.6 < f_{23}/f_4 < 1.2 \tag{10}$$

where $f_{23}$ is the composite focal length of said second and third lens units at the tele end, and $f_4$ is the focal length of said fourth lens unit.

22. A compact wide-angle zoom lens system according to claim 18 or 19, wherein said fourth lens unit satisfies the following condition (11):

$$2.5 < \beta_{4T} < 4.0 \tag{11}$$

where $\beta_{4T}$ is the lateral magnification of said fourth lens unit at the tele end.

* * * * *